US007766409B2

(12) United States Patent
Ohnuki

(10) Patent No.: US 7,766,409 B2
(45) Date of Patent: Aug. 3, 2010

(54) LID OPENING AND CLOSING SYSTEM

(75) Inventor: Tomoyoshi Ohnuki, Kanagawa (JP)

(73) Assignee: PIOLAX, Inc., Yokohama-shi, Kanagawa (JP)

( * ) Notice: Subject to any disclaimer, the term of this patent is extended or adjusted under 35 U.S.C. 154(b) by 244 days.

(21) Appl. No.: 12/153,594

(22) Filed: May 21, 2008

(65) Prior Publication Data

US 2008/0290685 A1 Nov. 27, 2008

(30) Foreign Application Priority Data

May 22, 2007 (JP) ........................... P2007-135612
May 14, 2008 (JP) ........................... P2008-126881

(51) Int. Cl.
*B62D 25/12* (2006.01)

(52) U.S. Cl. .................................... 296/37.12; 292/231

(58) Field of Classification Search ................ 296/38.1, 296/37.8, 37.12, 70, 76; 70/237; 292/216, 292/230–232, 233, 236, 130–132, 134, DIG. 37, 292/DIG. 22

See application file for complete search history.

(56) References Cited

U.S. PATENT DOCUMENTS 6,772,613 B2 * 8/2004 Webb et al. ................. 292/148
6,832,807 B2 * 12/2004 Tezuka ....................... 296/128

FOREIGN PATENT DOCUMENTS

JP 2005-104192 4/2005
JP 2006-327332 12/2006

* cited by examiner

*Primary Examiner*—Lori L Lyjak
(74) *Attorney, Agent, or Firm*—McGinn IP Law Group, PLLC

(57) ABSTRACT

According to an aspect of the present invention, there is provided a lid system including: a lid mounted to a recess to be opened and closed; a locking unit that retains the lid in a locked state to keep the lid closed; and a lock releasing unit that releases the locked state to open the lid. The locking unit includes: a pin that is protruded from a peripheral edge of the lid to be engaged with a hole on the recess in the locked state and retreated to release the locked state. The lock releasing unit includes: a push button pushable in a pushing direction; and a pushing element moved to push the lock pin in an opposite direction of the pushing direction by being linked with the push button.

7 Claims, 17 Drawing Sheets

LID OPENING AND CLOSING SYSTEM

CROSS-REFERENCE TO RELATED APPLICATIONS

This application claims priority from Japanese Patent Application No. 2007-135612 filed on May 22, 2007, and from Japanese Patent Application No. 2008-126881 filed on May 14, 2008, the entire contents of which are incorporated herein by reference.

BACKGROUND OF THE INVENTION

1. Field of the Invention

An aspect of the present invention relates to a lid opening and closing system for opening and closing a lid of a glove box, for example, from and to a recess formed on an automobile.

2. Description of the Related Art

For example, a glove box is provided in front of a front passenger's seat of an automobile to be opened and closed, and as a means for opening, closing and locking a lid of a glove box of this type relative to a recess provided on an automobile's side, JP-A-2005-104192 discloses a glove box opening, closing and locking system having an operating portion which is mounted on an instrument panel side and provided with a push type knob and a pair of lock portions which are linked with each other in such a manner as to appear from and disappear into both left- and right-hand sides of a lid. In addition, the operating portion has an operation piece which moves in a direction which intersects at right angles a direction in which the knob is pushed. Then, when the knob is pushed, the operation piece moves at right angles to the knob, whereby the lock portions are pushed inwards of the lid, as a result of which the lid is opened from the recess by virtue of its own weight.

In the glove box opening, closing and locking system, however, when a frictional force is exerted between a peripheral edge of the recess on the automobile side and the lid due to the lid being distorted or warped, even though the lock portions are caused to retreat inwards of the lid so as to unlock the lid, there sometimes occurs a situation in which the lid is not opened by gravity.

JP-A-2006-327332 discloses a glove box constructed as shown in FIG. 15. A glove box opening, closing and locking system is disclosed which has a push-type operation button 1 mounted on an instrument panel side and a pair of engagement members 3 linked with each other by a rack and pinion mechanism in such a manner as to appear from and disappear into both left- and right-hand sides of a lid 2. In addition, a push pin 4 is provided on a side of the operation button 1 to move in a direction which intersects at right angles a direction in which the operation button 1 is pushed. A first slope 1*a* is formed at a distal end of the operation button 1, and this slope is brought into abutment with a second slope 4*a* formed on a side of the push pin 4. A tapered surface 4*b* is formed on the other side of the push pin 4. When the operation button 1 is pushed, the pushing force is transmitted to the second slope 4*a* via the first slope 1*a*. As this occurs, the push pin 4 moves in the direction at right angles to the operation button 1 and pushes at a distal end portion of the engagement member 3 so as to cause the engagement members 3 to retreat inwards of the lid 2, and the tapered surface 4*b* of the push pin 4 is brought into abutment with a corner portion 5*a* of a box 5 and pushes at the corner portion 5*a* so as to push the lid to open.

In the case of JP-A-2006-327332, however, the pushing force from the operation button 1 is transformed via the push pin 4 into the pushing force acting at right angles to the pushing force from the operation button 1, the engagement members 3 are caused to retreat by the push pin 4, and the tapered surface 4*b* of the push pin 4 is brought into abutment with the corner portion 5*a* of the box 5 to push open the lid 2. However, since the two tapered surfaces 4*a*, 4*b* are involved in the pushing action from when the operation button 1 is pushed to when the pushing force of the operation button 1 is transmitted to the lid 2, the force acting in the direction in which the lid 2 is opened is weakened, leading to a problem that the pushing force of the operation button 1 is made difficult to act effectively as the force with which the lid 2 is opened.

SUMMARY OF THE INVENTION

An object of the present invention is to provide a lid opening and closing system which can ensure that a lid is opened from a recess on a body by causing a pushing force from the user to act on a lock pin effectively.

According to an aspect of the present invention, there is provided a lid opening and closing system including: a lid that is mounted to a recess formed in a vehicle to be opened and closed with respect to the recess; a locking unit that is disposed on the lid and that retains the lid in a locked state when the lid is closed; and a lock releasing unit that is disposed in the vehicle and that releases the locked state of the lid, wherein the locking unit includes: a lock pin that is urged to protrude from a peripheral edge of the lid, that is retreatable into the peripheral edge and that is engaged with an engagement hole provided on an inner circumference of the recess in the locked state, wherein the lock releasing unit includes: a push button that is pushable in a pushing direction that is a direction from a front to a rear of the lid; a pushing element that is moved to push the lock pin or a part that is linked therewith to retreat the lock pin toward the lid to release the locked state; and a link unit that links the push button and the pushing element so that the pushing element is moved in an opposite direction of the pushing direction when the push button is pushed, and wherein a slope is provided at least one of contacting surfaces of the lock pin and the pushing element.

According to such a configuration, since when the push button is pushed, the pushing element moves in the opposite direction to the pushing direction of the push button in a linked fashion to thereby contact the lock pin or the part which is linked therewith, whereby the lock pin is pushed by the slope provided on at least one of the abutting surfaces in such a manner as to retreat into the lid's side, the locked state is released, and the lid can be opened.

As this occurs, since the pushing element pushes at the lock pin by the slope provided at least one of the abutting surfaces not only in the direction in which the lock pin is caused to retreat in the lid's side but also in the direction in which the lid is opened, when the lock pin is pulled out from the engagement hole provided on the inner circumference of the recess, the force is exerted which acts in the direction in which the lid is opened, whereby the lid can be opened in a smooth fashion. Consequently, even though a state results in which a frictional force is exerted between the lid and the recess, making it difficult for the lid to open by gravity, the lid can be opened in an ensured fashion.

The pushing element may contact a part of the lid and pushes the lid in a opening direction thereof when the locked state is released.

According to such a configuration, since when the lock pin is pushed into the lid's side by the pushing element to thereby release the locked state, the pushing element contacts the part of the lid so as to impart the pushing force in the direction in which the lid is opened, the lid can be opened in a more ensured fashion.

The link unit may include a rack and pinion mechanism or a link lever mechanism.

According to such a configuration, the mechanism which is linked with the push button to cause the pushing element to move in the opposite direction to the direction in which the push button is pushed can be realized by a relatively simple mechanism and in a space saving fashion.

The lock pin may include: a pair of lock pins that are linked with each other to protrude from and retreat into both sides of the peripheral edge of the lid. A pair of engagement holes may be provided on both sides of the inner circumference of the recess to be engaged with the pair of lock pins.

According to such a configuration, since the pair of lock pins which are made to appear from and disappear into both the side peripheral edges of the lid are brought into engagement with the engagement holes in both the sides of the recess, respectively, even in the event that for example, a slight warp is produced in the lid or a slight dimension error is caused between the lid and the recess on the automobile's side, the lid can be held in the closed state without any looseness.

The lock pin may include: a pin portion that is engaged with the engagement hole; and a receiving portion that is bifurcated from the pin portion. The pushing element may push the receiving portion to retreat the lock pin toward the lid.

According to such a configuration, the push pin of the pushing element is made to push at not the pin portion which is engaged with the engagement hole but at the receiving portion which is different from the pin portion, so as to cause the lock pin to retreat toward the lid. Therefore, an angle of the distal end portion of the receiving portion with respect to the longitudinal side face of the lock pin can be changed while keeping the shape of the pin portion. That is, the angle of the distal end portion of the receiving portion can be set to change a ratio between a moving amount of the lock pin and a moving amount of the pushing pin while ensuring a sufficient locking condition. For example, when the angle is formed gently, the pushing stroke of the push button required to release the lock state can be reduced. On the other hand, when the angle is formed steeply, the pushing force of the push button can be reduced.

An inner circumference of the engagement hole may include: a first edge that is located at a position away from the lid; and a second edge that is located at a position closer to the lid. The second edge may be positioned outwardly in a projecting direction of the lock pin than the first edge. The pushing element may be moved along a direction from the first edge to the second edge to retreat the lock pin toward the lid.

According to such a configuration, since the lock pin can be pushed into the interior of the lid by the pushing element moving from the edge portion of the engagement hole which lies farther away from the lid towards the edge portion which lies closer to the lid and the lock pin can be caused to retreat further inwards than the edge portion of the engagement hole which lies closer to the lid in an ensured fashion in the position where the pushing element contacts or lies close to the edge portion of the engagement hole which lies closer to the lid, the release of the engagement of the lock pin can be implemented in a more ensured fashion.

The lock pin may include: a first slope that is provided at a distal end portion thereof and that contacts the a peripheral edge of the recess to retreat the lock pin when the lid is closed; and a second slope that is disposed adjacent to the first slope and that is pushed by the pushing element when the lid is opened. The first slope may be formed steeper than the second slope with respect to the a longitudinal side face of the lock pin.

According to such a configuration, since the pushing element slope is formed at a less steep inclination angle than the pin slope relative to the longitudinal side face of the lock pin, when the pushing element is driven to move in conjunction with the operation of the push button to push at the pushing element slope, the lock pin can be caused to move largely relative to the moving amount of the pushing element. On the other hand, since the pin slope is formed at a steeper angle relative to the longitudinal side face of the lock pin, the pin slope contacts the peripheral edge of the recess, so that the lock pin can be caused to retreat inwards of the lid in a smooth fashion.

BRIEF DESCRIPTION OF THE DRAWINGS

These and other objects and advantages of this invention will become more fully apparent from the following detailed description taken with the accompanying drawings in which.

DETAILED DESCRIPTION OF THE EMBODIMENTS

Embodiments of the present invention will be described by reference to the drawings. FIGS. 1 to 11 show a first embodiment.

Figure 1:
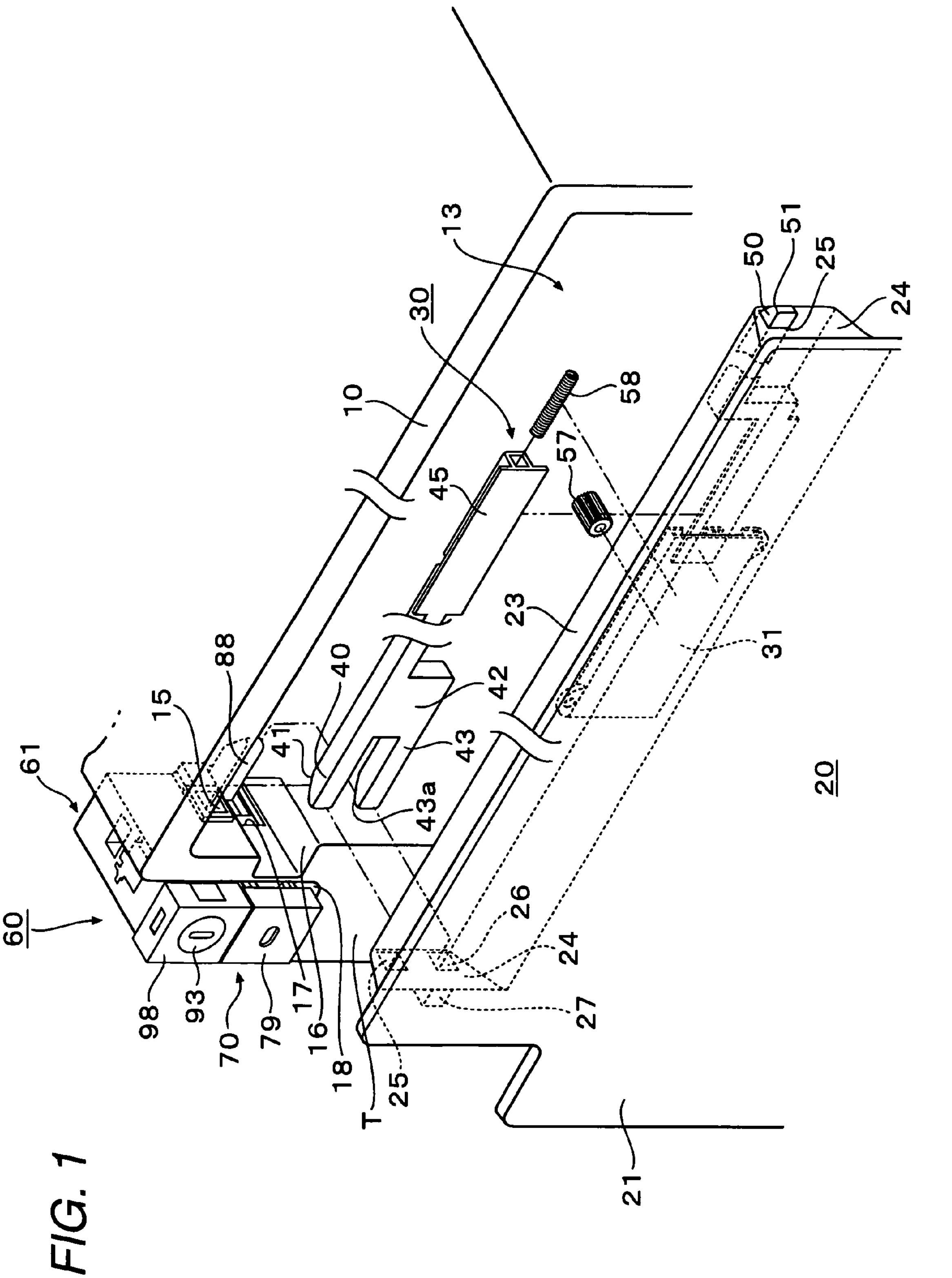
FIG. 1 is a perspective view showing a lid opening and closing system according to a first embodiment.

As is shown in FIG. 1, this lid opening and closing system includes a lid 20 which is mounted in a recess 13 formed on an automobile in such a manner as to be opened and closed, a lock unit 30 for locking the lid 20 in a closed state, and a lock releasing unit for releasing the locked state of the lid 20 by the lock unit 30. In the embodiment, the recess 13 is such as to be formed into a box-shaped glove box 10 which is fixedly provided in an instrument panel of the automobile. Note that there is imposed no specific limitation on the recess 13, and the recess 13 may be such a recess as provided on a side wall or a bottom wall in a passenger compartment of the automobile.

As is shown in FIG. 1, the recess 13 is formed into a laterally elongated shape, and a pair of engagement holes 15, is provided on both left- and right-hand sides of the recess 13 so that a pair of lock pins 40, 50, which will be described later, is brought into engagement therewith, respectively. A recessed groove 16 of a given length is formed on an inner circumference or an inner peripheral side of the recess 13 in a position which lies deeper in the glove box 10 and below the left-hand side engagement groove 15 as viewed in the figure, and this recessed groove 16 constitutes a location where a pushing element receiving portion 43 (which will be described later) which projects from a side wall 24 of the lid 20 is inserted when the lid 20 is closed. An elongated hole 17 is formed further deeper than the recessed groove, so that a push pin 88 (which will be describe later) of the lock releasing unit 60 is allowed to move therein in a back and forth direction (a depth direction) of the glove box 10. A top left-hand side corner of the glove box 10 is cut into a rectangular shape so as to define a mounting recessed portion 18, in which the lock releasing unit 60 is mounted, so that the push pin 88, which makes up the lock releasing unit 60, passes through the elongated hole 17 to project into the recess 13.

The lid 20, which is mounted in the recess 13 to be opened and closed, is made up of a laterally elongated front plate 21 of which a top left-hand side corner is cut to conform to the shape of the glove box 10, and a laterally elongated housing 23 which is mounted on a rear side of the front plate 21 and is formed in a width which substantially match the opening width of the recess 13. Support shafts, not shown, are provided at lower portions on both sides of the lid 20 to project therefrom, and these support shafts are inserted into shaft holes, not shown, provided at lower portions of both side of the recess, so that the lid 20 is mounted to be opened and closed relative to the recess 13.

A pair of pin passage holes 25, 25 is formed on both side walls 24, 24 of the housing 23. In addition, the lock unit 30 is attached to a rear side of the front plate 21, and the lock unit 30 is covered with the housing 23. The pair of pin passage holes 25, 25 is formed on both the side walls 24, 24 of the housing 23, so that distal end portions of the pins 40, 50 are made to appear (protrude) from and disappear (retreat) into the pin passage holes 25, 25, respectively.

Figure 9:
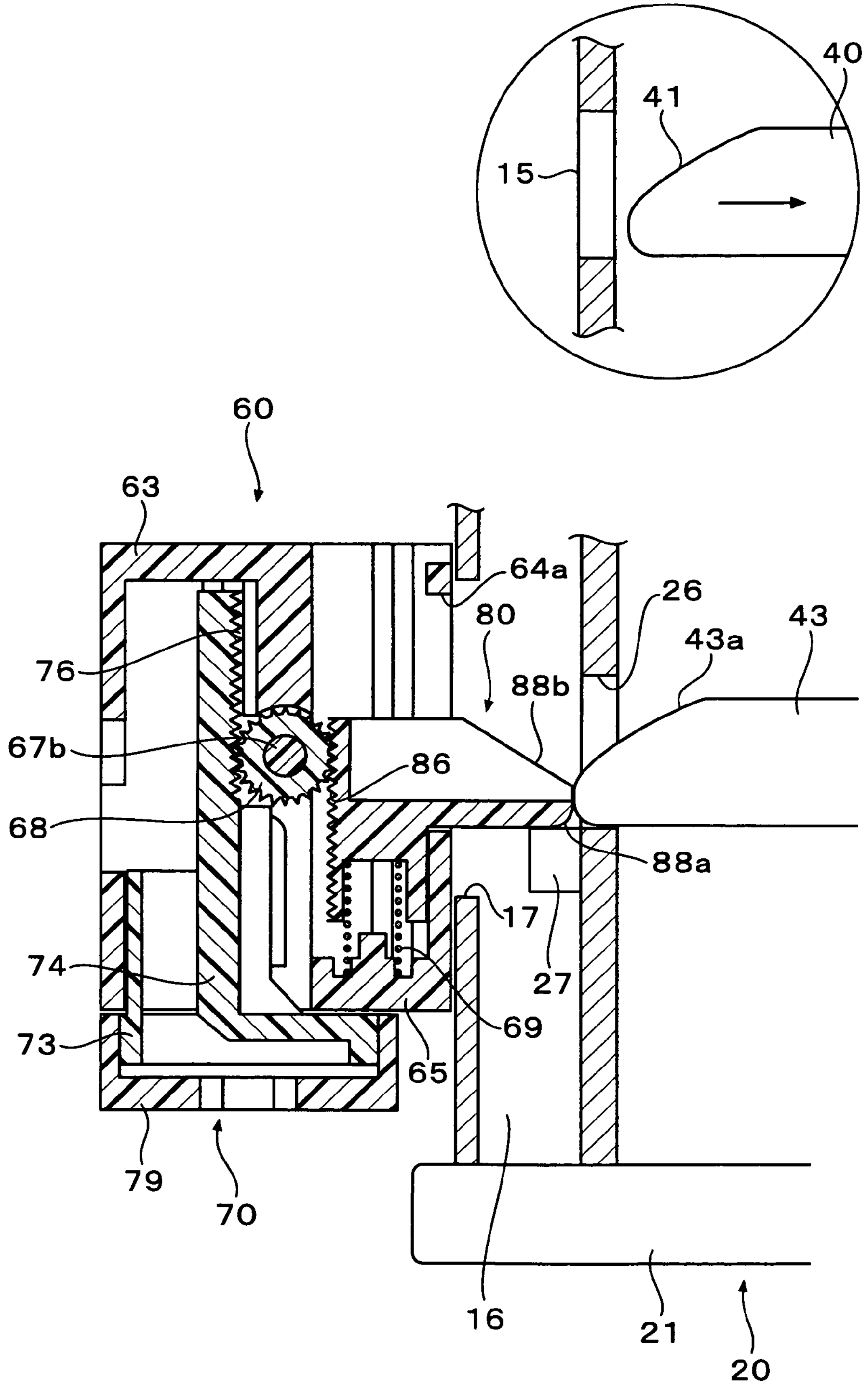
FIG. 9 is a sectional view showing a third operating state of the lock releasing unit.
Figure 10:
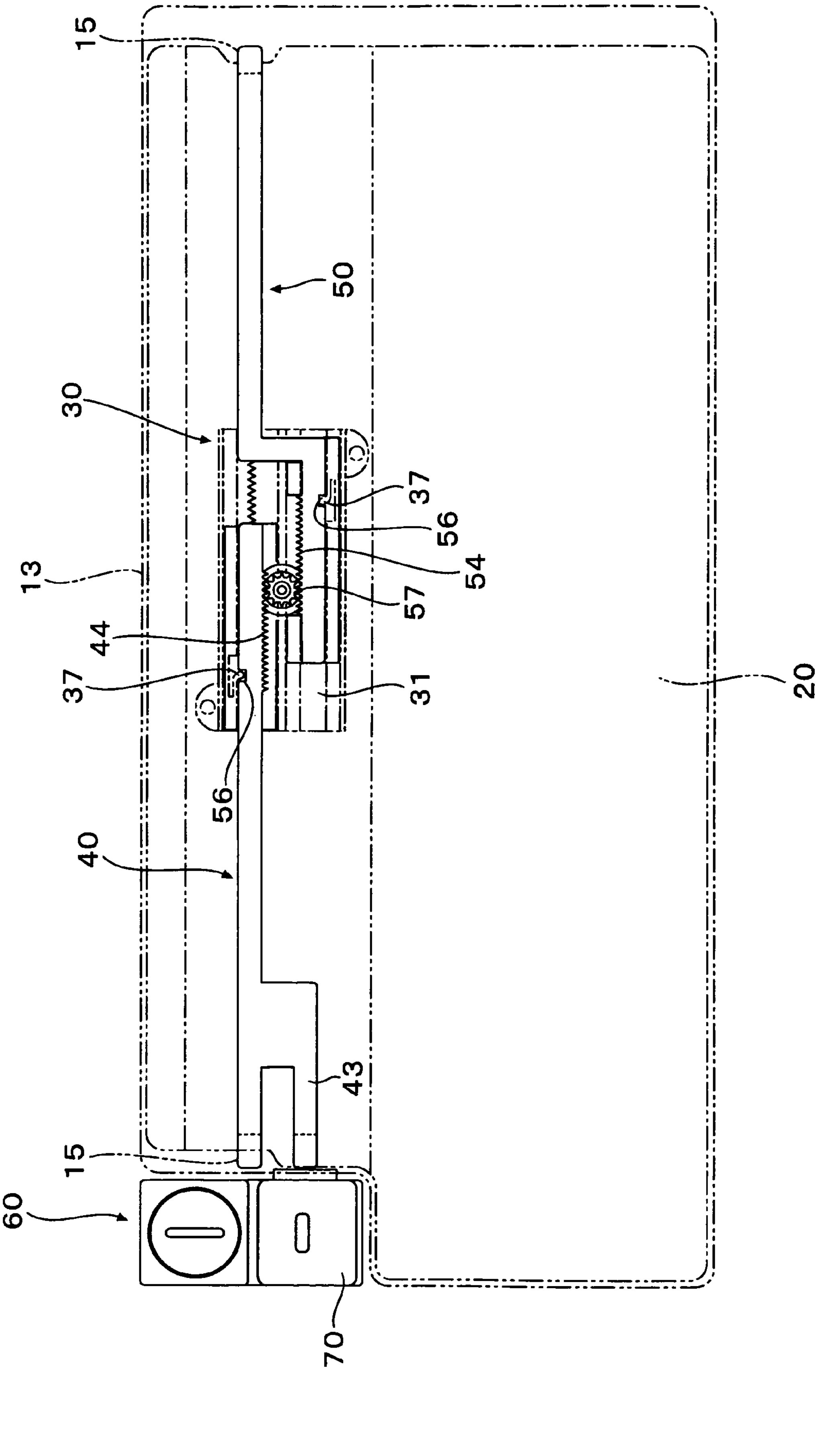
FIG. 10 is an explanatory diagram showing a state in which a lid is closed by the lid opening and closing system.

As is shown in FIG. 1, a receiving portion passage hole 26 is formed below the pin passage hole 25 on the left side wall 24 as viewed in the figure in such a manner that the pushing element receiving portion 43, which is a portion linked with the lock pin, is allowed to appear therefrom and disappear thereinto. A pushing raised portion 27 is formed on the left side wall 24 in a position which lies adjacent to the receiving portion passage hole 26 and closer to the front plate 21 to project to a given height. As is shown in FIG. 9, this pushing raised portion 27 constitutes a portion to be contacted by the push pin 88 of the lock releasing unit 60 after the pushing element receiving portion 43 linked with the lock pin has been contacted by the push pin 88 to cause it to retreat inwards of the lid 20, and a pushing force is made to be exerted in a direction in which the lid 20 is opened.

In addition, while the lid 20 that has been described heretofore is such as to open and close the recess 13 in the glove box 10 formed on the automobile's side, the present invention may be applied to a glove box in which a lid itself is formed into a box shape having a storage recess provided in an interior thereof.

The lock unit 30 is attached to the lid 20 for locking the lid 20 in its locked state when the lid 20 is closed to cover the recess 13. This lock unit 30 has the pair of lock pins including the first lock pin 40 and the second lock pin 50 and includes a rack and pinion mechanism which causes the respective lock pins 40, 50 to appear from and disappear into the pin passage holes 25, 25 in a linked fashion, and the lock unit 30 has a coil spring 58 which urges the respective lock pins 40, 50 to normally projects from the pin passage holes 25, 25.

Figure 2:
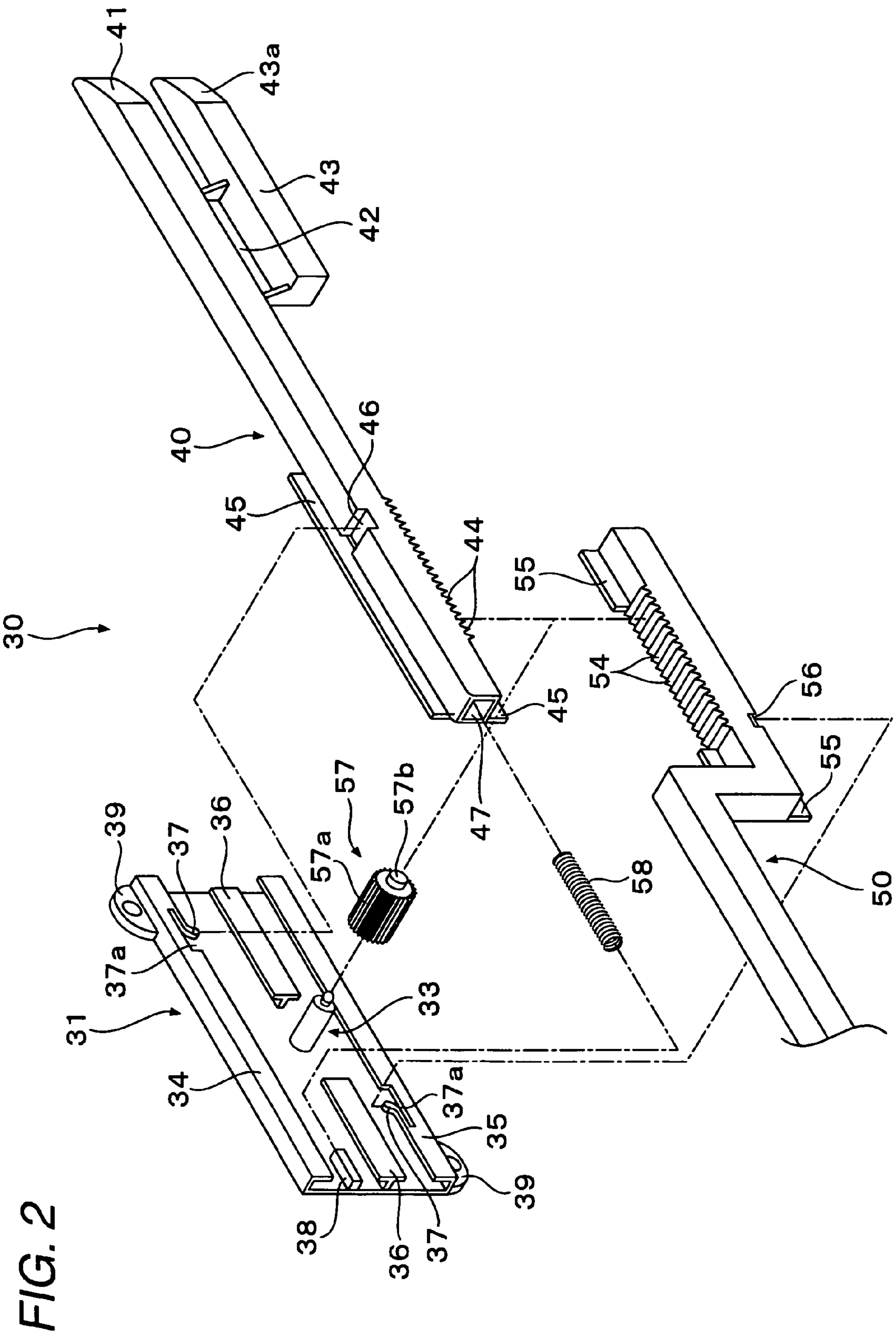
FIG. 2 is an exploded perspective view of the lid opening and closing system.
Figure 3:
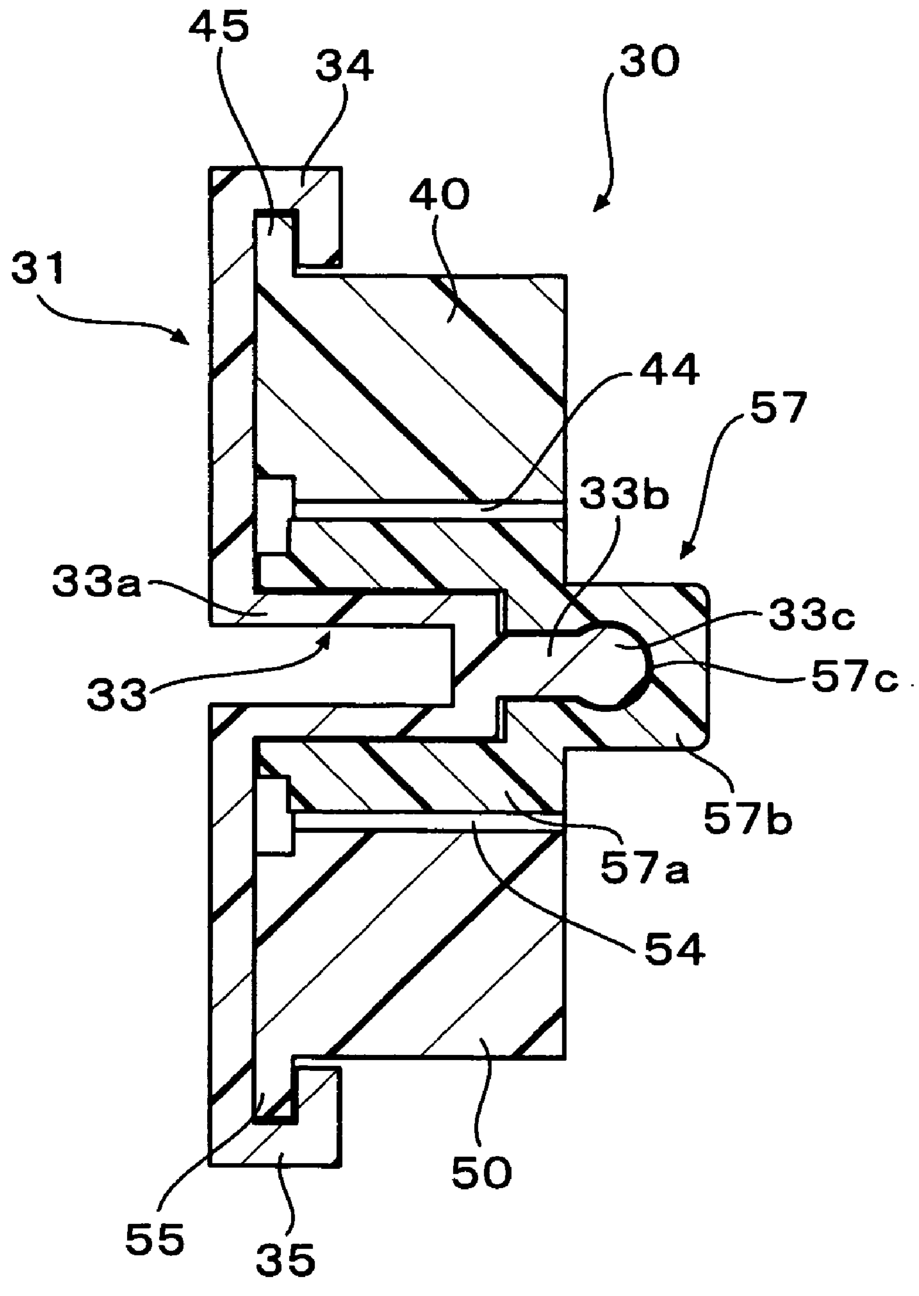
FIG. 3 is a sectional view of a main part of a lock unit of the lid opening and closing system.

As is shown in FIG. 2, the lock pins 40, 50 are supported slidably on a substantially long plate-shaped base portion 31 which is fixed to the rear side of the front plate 21. A support shaft 33 which supports rotatably a pinion gear 57 is provided in a longitudinally central position on a rear side of the base portion 31. Referring to FIG. 3 as well, this support shaft 33 is made up of a bottomed cylindrical portion 33*a* which is provided on the rear side of the base portion 31 to erect therefrom, a pillar portion 33*b* which is provided to erect from the cylindrical portion 33*a*, and a spherical portion 33*c* which is provided at a distal end portion of the pillar portion 33*b*. On the other hand, the pinion gear 57, which is supported rotatably on the support shaft 33, is made up of a bottomed cylindrical main body portion 57*a* round which thread grooves are formed to mesh with both rack grooves 44, 54 (which will be described later) of the respective lock pins 40, 50, and a projecting portion 57*b* which projects from the center of the main body 57*a*, and a spherical recessed portion 57*c* is formed inside the projecting portion 57*b*. In addition, the cylindrical portion 33*a* is inserted into an inner circumference of the main body portion 57*a* so as to cause the spherical portion 33*c* at the distal end thereof to fit in the spherical recessed portion 57*c*, whereby the pinion gear 57 is supported rotatably on the support shaft 33 in such a state that the pinion gear 57 is prevented from being dislocated from the support shaft 33.

Referring again to FIG. 2, an upper guide wall 34 and a lower guide wall 35 are provided on the rear side of the base portion 31 by bending at right angles upper and lower peripheral edges thereof to erect from the upper and lower peripheral edges to a given height, as well as to approach each other at end portions thereof, and intermediate guide walls 36 each having a T-shaped cross section are provided intermediately between both the guide walls 34, 35 and in portions which lie on both sides of the support shaft 33. In addition, dislocation preventing claws 37, 37 are formed respectively, on the upper guide wall 34 and the lower wall 35 in positions confronting each other obliquely or diagonally to be deflected via slits 37*a*. As is shown in FIG. 2, a spring receiving portion 38 which supports one end portion of the coil spring 58 is provided in a lateral side portion of the rear side of the base portion 31 between the upper guide wall 34 and the intermediate guide wall 36.

The pair of lock pins 40, 50 which are slidably attached to the base portion 31 will be described. The first lock pin 40 is formed substantially into the shape of a prism and extends a given length and a pin slope 41 is provided at a distal end portion thereof. The pin slope 41 is shaped so that a side away from the lid 20 is tapered and its thickness becomes gradually thinner toward the distal end portion thereof. This distal end portion constitutes a portion which is engaged with and disengaged from the engagement hole 15 in the glove box 10, and when the lid 20 is closed, the pin slope 41 is gradually brought into abutment with a peripheral edge portion of the recess 13 of the glove box 10 to cause the first lock pin 40 to retreat into the interior of the lid in a smooth fashion.

In addition, a connecting portion 42 is provided on a lower side of the first lock pin 40 in a position which lies along an axial direction of the first lock pin 40 and slightly before the distal end portion thereof to erect therefrom, and the pushing element receiving portion 43 is provided on the first lock pin 40 via the connecting portion 42 to extend parallel to the distal end portion so as to form a bifurcate configuration together with the distal end portion. As at the distal end portion of the first lock pin 40, a receiving portion slope 43*a* is formed on the pushing element receiving portion 43. The receiving portion slope 43*a* is shaped so that a side away from the lid 20 is tapered and its thickness becomes gradually thinner toward the distal end portion thereof.

Rack grooves 44 are formed on the lower side of the first lock pin 40 at a distal end portion thereof, and guide ribs 45, 45 are provided to project from both upper and lower sides of the distal end portion of the first lock pin 40. A dislocation preventing recessed portion 46 is provided on the upper side which lies opposite to the side where the rack grooves 44 are formed. In addition, a spring receiving hole 47 is provided in a proximal end face of the first lock pin 40 so that the other end portion of the coil spring 58 is inserted and supported in place therein.

The second lock pin 50 is formed into a similar shape to that of the first lock pin 40. The second lock pin 50 extends in the form of a prism and has a pin slope 51 which is provided at a distal end portion. The pin slope 51 is shaped so that a side away from the lid 20 is tapered and its thickness becomes gradually thinner toward the distal end portion thereof. As with the distal end portion of the first lock pin 40, the distal end portion of the second lock pin 50 constitutes a portion which is engaged with and disengaged from the engagement hole 15 in the glove box 10, and the pin slope 51 is a portion which causes the second lock pin 50 to retreat inwards of the lid 20 in a smooth fashion. A portion of the second lock pin 50 which lies along an axial direction thereof is bent downwards at right angles and bent right angles again to extend coaxially with the distal end portion to constitute a proximal end portion. Rack grooves 54 are formed on an upper side of this distal end portion, and ribs 55, 55 are provided to project from both the upper and lower sides of the distal end portion. A dislocation preventing recessed portion 56 is provided on the lower side of the distal end portion.

In such a state that the other end portion of the coil spring 58 is inserted into the spring receiving hole 47 in the first lock pin 40, the guide ribs 45, 45 of the first lock pin 40 are aligned with the upper guide wall 34 and the intermediate guide wall 36, and the first lock pin 40 is pushed in the base portion 31 from one of the lateral side portions thereof, whereby the one end portion of the coil spring 58 abuts with the spring receiving portion 38, and the dislocation preventing claw 37 is brought into engagement with the dislocation preventing recessed portion 46, thereby the first lock pin 40 being supported on the base portion 31 to be prevented from being dislocated therefrom with the coil spring 58 compressed. Similarly, the second lock pin 50 is pushed in the base portion 31 from the other side portion thereof with their guide ribs 55, 55 aligned with the lower guide wall 35 and the intermediate guide wall 36, whereby the dislocation preventing claw 37 is brought into engagement with the dislocation preventing recessed portion 56, thereby the second lock pin 50 being supported on the base portion 31 to be prevented from being dislocated therefrom. The deflectable dislocation preventing claws 37, 37 are dislocated respectively from the dislocation preventing recessed portions 46, 56 when the lock pins 40, 50 are caused to retreat inwards of the lid 20, so as to allow the respective lock pins 40, 50 to slide.

In the state that has resulted as described above, by inserting the cylindrical portion 33*a* of the support shaft 33 in the inner circumference of the main body portion 57*a* of the pinion gear 57, so that the spherical portion 33*c* at the distal end of the cylindrical portion 33*a* is fitted in the spherical recessed portion 57*c*, the pinion gear 57 is supported rotatably on the support shaft 33 to be prevented from being dislocated therefrom (refer to FIG. 3), and the pinion gear 57 meshes with the respective rack grooves of the first lock pin 40 and the second lock pin 50, whereby the respective lock pins 40, 50 are assembled together to slide in a linked fashion via the rack and pinion mechanism. The lock unit 30 which has been built up in the way described above is fixedly screwed in a given location of the front plate 21 of the lid via mounting pieces 39, 39 which are provided on the upper and lower peripheral edges of the base portion 31, and the housing 23 is fixedly secured to the rear side of the front plate 21 to cover the lock unit 30. Thus, the lock unit 30 is attached to the lid 20 and the respective lock pins 40, 50 are made to appear from and disappear into both side peripheral edges of the lid 20. Namely, the first lock pin 40 and the pushing element receiving portion 43 are made to appear from and disappear into the pin passage hole 25 and the receiving portion passage hole 26, respectively, which are provided on the left side wall 24 of the housing 23, while the second lock pin 50 is made to appear from and disappear into the pin passage hole 25 provided on the right side wall 24 of the housing 23 (refer to FIG. 1). The lock unit 30 is made such that, when one of the lock pins is caused to slide, the other pin is driven to linkingly slide therewith by the rack and pinion mechanism (refer to FIGS. 10, 11). Since the first lock pin 40 is urged to normally project from the pin passage hole 25 on the peripheral side wall 24 of the lid 20, in conjunction with this, the second lock pin 50 is also urged to project from the pin passage hole 35 on the side wall 24 on the opposite side.

Next, referring to FIGS. 4 to 9 as well, the lock releasing unit 60 will be described which is adapted to release the locked state of the lid 20 by the lock unit 30. The lock releasing unit 60 of this embodiment has a case main body 61 which is formed into a vertically elongated box shape to mach the mounting recessed portion 18 of the glove box 10 which has been described above, a push button 70 which is mounted on the case main body 61 to be pushed, and a pushing element 80 which is driven by being linked with the operation of the push button 70 to move in an opposite direction to the direction in which the push button 70 is pushed by a rack and pinion mechanism in a similar manner to that in which the pair of the lock pins 40, 50 are done.

In the embodiment, the push button is provided on a plane of the recess on the automobile which confronts the lid. Here, the "plane of the recess on the automobile which confronts the lid" means a plane which lies on the periphery of the portion which is opened and closed by the lid 20 and is substantially parallel to the lid 20. In the embodiment, for example, a plane denoted by a reference character T corresponds to the plane, and the push button 70 is provided on the plane T.

Figure 4:
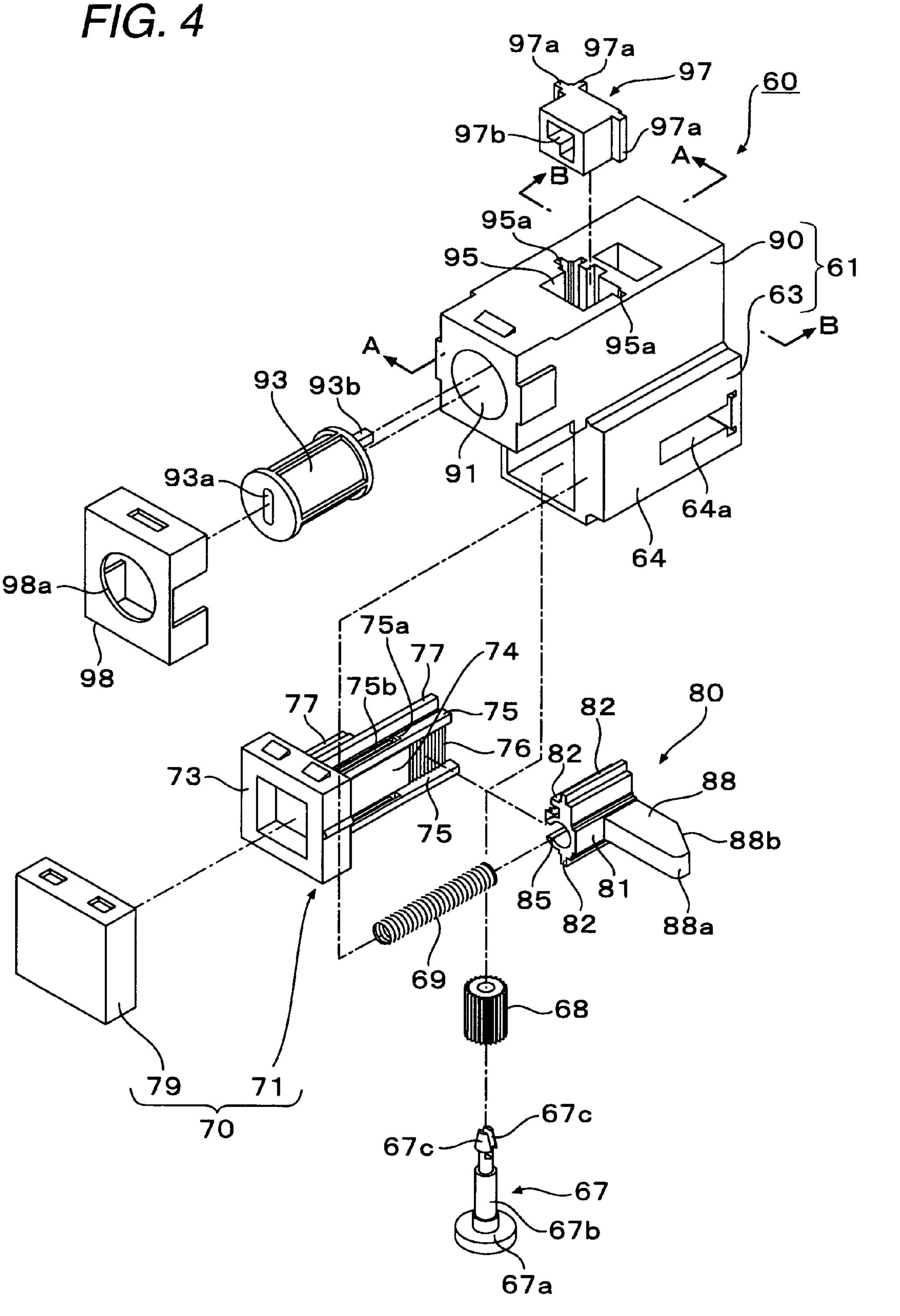
FIG. 4 is an exploded perspective view of a lock releasing unit of the lid opening and closing system.
Figure 6:
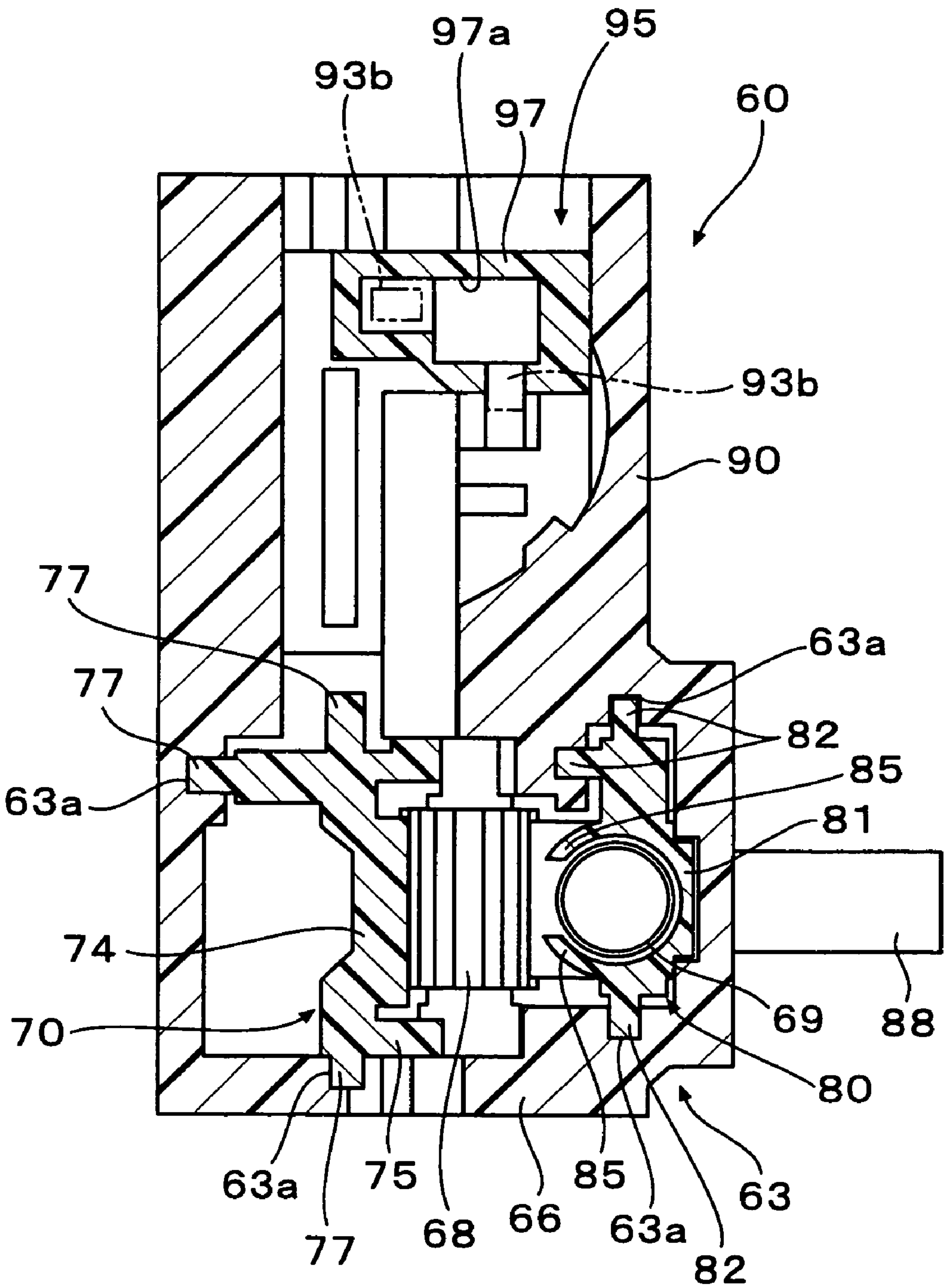
FIG. 6 is a sectional view taken along the line B-B in FIG. 4, which shows a state in which the lock releasing unit is built into the lid opening and closing system.
Figure 7:
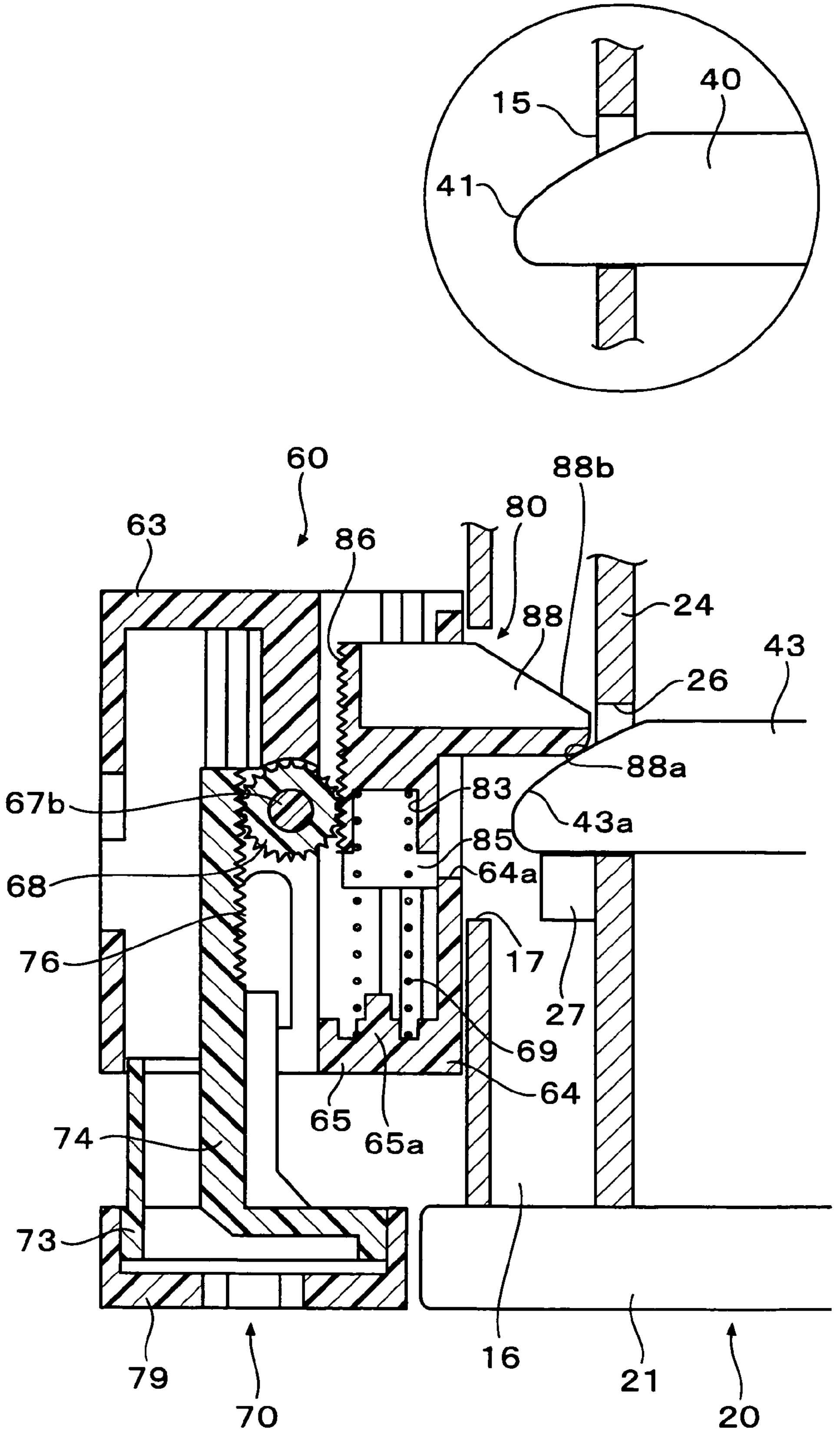
FIG. 7 is a sectional view showing a first operating state of the lock releasing unit.

The case main body 61 has a lower case 63 and an upper case 90 which is provided on the lower case 63 and which projects from a front end face of the lower case 63. Firstly, the lower case 63 will be described. In the lower case 63, a front left-half portion is opened into a rectangular shape, and a rear right-half portion is opened similarly (refer to FIGS. 4, 7) and the lower case 63 is formed into the shape of a box which extends along in a back and forth or longitudinal direction. As is shown in FIG. 4, an elongated slide groove 64*a* is formed in one side wall 64 of the lower case 63, and as is shown in FIG. 6, a plurality of guide grooves 63*a* are provided on an inner circumference of the lower case to extend in the longitudinal direction. As is shown in FIG. 7, a supporting projection 65*a* for supporting one end portion of a coil spring 69 is provided on an inner side of a front wall 65 of the lower case 63 to project therefrom.

Then, a plurality of guide ribs 84 of the pushing element 80, which will be described later, are fitted in the guide grooves 63*a*, respectively, and in such a state that the push pin 88 of the pushing element 80 which projects laterally outwards of the case main body 61 through the slide groove 64*a*, the pushing element 80 is supported to slide along the longitudinal direction of the case main body 61, and similarly, a plurality of guide ribs 77 of the push button 70, which will be described later, are also fitted in the guide grooves 63*a*, respectively, whereby the push button 70 is supported to slide in the longitudinal direction of the case main body 70.

Figure 5:
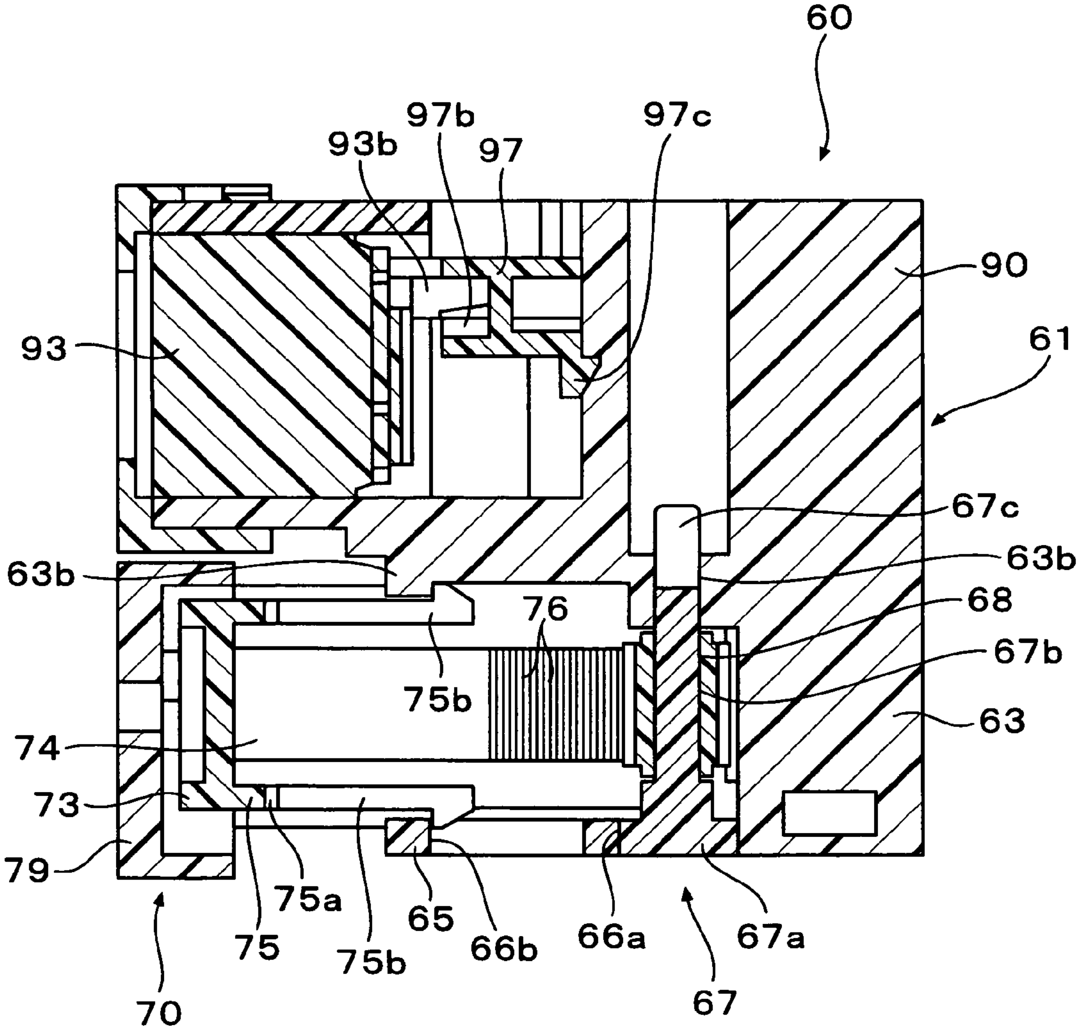
FIG. 5 is a sectional view taken along the line A-A in FIG. 4, which shows a state in which the lock releasing unit is built into the lid opening and closing system.

As is shown in FIG. 5, a circular shaft insertion hole 66*a* is provided in a portion of the lower case 63 which lies closer to a rear end portion of a bottom wall 66. In relation to this, a support shaft 67 will be described by reference to FIG. 4 which is inserted in the shaft insertion hole 66*a*. This support shaft 67 is made up of a circular lid 67*a*, a pillar portion 67*b* which is provided to erect from the circular lid 67 so as to be inserted into an inner circumference of a pinion gear 68, and a pair of engagement claws 67*c*, 67*c* which is provided at a distal end portion of the pillar portion 67*b* after extending from the pillar portion 67*b* in a bifurcated fashion.

Then, by inserting the support shaft 67 from the shaft insertion hole 66*a* in such a state that the pinion gear 68 round which thread grooves meshing with both rack grooves 76 on the push button 70 and rack grooves 86 on the pushing element 80 are formed is fitted on the pillar portion 67*b*, the pair of engagement claws 67*c*, 67*c* is, as is shown in FIG. 5, brought into engagement with a circumferential edge of engagement holes 63*b* in an upper portion of the lower case 63, respectively, whereby the pinion gear 68 can be provided in a given location. As is shown in FIG. 5, an opening 66*b* is provided in a portion of the bottom wall 66 which lies closer to a front end portion thereof, and locking claws 75*b* of the push button 70 are brought into engagement with a circumferential edge of the opening 66*b*, whereby the dislocation of the push button 70 from the case main body 61 is made to be prevented.

The push button 70 and the pushing element 80 linked therewith which is linked with the push button 70 are provided in the lower case 63 which has been described heretofore. The push button 70 has a button main body 71 and a button cover 79 which is attached to a front side of the button main body 71. The button main body 71 has a quadrangular frame-shaped frame element 73 and a strip-shaped member 74 which extends a given length from a rear end face of the frame element 73. Erect walls 75, 75 are provided on one of lateral sides of the strip-shaped member 74 along upper and lower peripheral edges thereof to project therefrom to a given height, and the rack grooves 76 are formed on one side of a distal end portion of the strip-shaped member 74 to mesh with the pinion gear 68.

The locking claw 75*b* is formed on each of the erect walls 75, 75 via a U-shaped slit 75*a* to be brought into engagement with a stepped portion 63*b* provided on an upper wall of the lower case 63 to project therefrom and the circumferential edge of the opening 66*b* in the bottom wall 66. The guide ribs 77 are made to project from both upper end lower end faces and the other lateral side of the strip-shaped member 74 to fit in the guide grooves 63*a* of the lower case 6 (refer to FIGS. 4, 6). The button cover 79, which is also formed into a similar frame shape, is attached to an outer circumference of the frame element 73.

The pushing element 80 has a sliding element 81 which extends along in one direction and the push pin 88 which is provided on one side of a rear end portion (a longitudinal end portion) of the sliding element 81 to project therefrom. Guide ribs 82 are provided on upper and lower end faces of the sliding element 81 to fit in the guide grooves 63*a* of the lower case 63. In addition, a spring receiving hole 83 is formed in a given depth in a front end face of the sliding element 81 into which the other end portion of the coil spring 69 is inserted and supported (refer to FIG. 7), and spring holding walls 85, 85 which are curved along an outer circumference of the spring are provided to erect from a circumferential edge of the spring receiving hole 83, so that the coil spring 69 is supported stably (refer to FIGS. 6, 7). The rack grooves 86 which mesh with the pinion gear 68 are formed on the other side of the sliding element 81 which is opposite to the side from which the push pin 88 is projected.

In the embodiment, the push pin 88 constitutes a portion to be slid linkingly with the first lock pin 40, that is, a portion for contacting the pushing element receiving portion 43. A corner portion 88*a* on a front side of a distal end portion thereof is formed into a rounded shape (R-shape), while formed on a back side of the distal end portion is a tapered surface 88*b* which is inclined in such a manner that a side away from the lid 20 is tapered and its thickness is reduced gradually toward the distal end portion thereof (refer to FIG. 7).

By forcing the guide ribs 77 of the push button 70 into the lower case 63 from the front opening thereof while aligning the guide ribs 77 with the corresponding guide grooves 63*a*, the pair of locking claws 75*b*, 75*b* are brought into engagement with the stepped portion 63*c* and the circumferential edge of the opening 66*b*, whereby the push button 70 is mounted in the lower case 63 (refer to FIG. 5). By forcing the pushing element 80 into the lower case 63 from the rear opening thereof while the push pin 88 of the pushing element 80 is projected laterally outwards from the slide groove 64*a* and the guide ribs 82 of the pushing element 80 are aligned with the corresponding guide grooves 63*a* in such a state that the other end portion of the coil spring 69 is supported by the spring receiving portion 83, the one end portion of the coil spring 69 is supported by the supporting projection 65*a*, and the pushing element 80 is mounted in the lower case 63 with the coil spring 60 compressed.

By inserting the support shaft 67 on the pillar portion 67*b* of which the pinion gear 68 is fitted from the shaft insertion hole 66*a* in the lower portion of the lower case 63, not only are the respective engagement claws 67*c* brought into engagement with the circumferential edges of the engagement holes 63*b*, respectively, as is shown in FIG. 5, whereby the pinion gear 68 is mounted in the lower case 63, but also the pinion gear 68 meshes with the respective rack grooves 76, 86 of the push button 70 and the pushing element 80, whereby the push button 70 and the pushing element 80 are built into the lower case 63 via the rack and pinion mechanism. As a result, when the push button 70 is pushed, the pushing element 80, which is linked with the push button 70, is driven by the push button 70 so pushed to move in an opposite direction to the direction in which the push button 70 is pushed, whereby the push pin 88 moves along the slide groove 64*a* in the longitudinal direction (refer to FIGS. 7 to 9). Since the pushing element 80 is normally urged by the coil spring 69 in a direction in which it moves away from the front wall 65 of the lower case 63, the push button 70 is urged in a direction in which it moves away from the front wall 65 of the lower case 63 in conjunction with the move of the pushing element 80 (refer to FIG. 7), whereby the frame element 73 of the push button 70 is spaced apart a given length from the front wall 65, and the push button 70 is allowed to be pushed an amount corresponding to the given length.

The upper case 90 formed on the lower case 63 is, as has been described above, formed into the shape which projects slightly longer than the front end face of the lower case 63 and has a circular accommodating hole 91 for accommodating therein a key cylinder 93. The key cylinder 93 is formed into a substantially cylindrical shape, and a key insertion hole 93*a* is formed in a front side thereof, while a moving projection 93*b* is provided on a rear side thereof. The key cylinder 93 is inserted rotatably within the accommodating hole 91.

A cut-out groove 95 is formed from an upper wall side of the upper case 90 to communicate with the accommodating hole 91, and a plurality of guide grooves 95*a* are formed along a vertical direction of the cut-out groove 95. A plurality of guide ribs 97*a* which are formed on a circumferential edge of a key tumbler 97 shown in FIG. 4 are fitted in the plurality of guide grooves 95*a*, respectively, whereby the key tumbler 97 is accommodated in the cut-out groove 95 so as to be vertically slidable. Formed on a front side of the key tumbler 97 is a projection moving groove 97*b* which is made up of a parallel groove and a groove which is bent at right angles to be directed downwards from an end portion of the parallel groove and in which the moving projection 93*b* of the key cylinder 93 is inserted, and a key projection 97*c* is provided to extend from a lower end portion on a rear side thereof (refer to FIG. 5). A key cover 98 having a circular hole 98*a* is mounted in front of the upper case 90.

When a key, not shown, is inserted into the key insertion hole 93*a* to rotate the key cylinder 93, the moving projection 93*b* thereof moves inside the projection moving groove 97*b* (refer to a two-dotted line in FIG. 6) to push the key tumbler 97 downwards, while the key projection 97*c* fits in a fitting groove, not shown, of the push button 70, whereby the push button 70 is locked and disabled from sliding.

The lock releasing unit 60 described heretofore is mounted in the mounting recessed portion 18 of the glove box 10 with a fixing member, not shown, and the push pin 88 of the pushing element 80 is made to project into the recess 13 from the elongated hole 17 lying deeper in the recess groove 16.

Next, how to use the lid opening and closing system configured as has been descried heretofore will be described.

When the lid 20 is rotated in the closing direction to close the recess 13 of the glove box 10, the pushing element receiving portion 43 enters the recessed groove 16 and moves until it reaches a position lying just before the push pin 88 (refer to FIG. 7). In conjunction with this, the circumferential edge portion is brought into engagement with the pin slopes 41, 51 of the respective lock pins 40, 50 which projects from the pin passage holes 25, 25, and pushes the pin slopes 41, 51 against the urging force of the coil spring 58, whereby the respective lock pins 40, 50 are caused to retreat inwards of the lid 20. When the distal end portions of the respective lock pins 40, 50 reach the pair of engagement holes 15, 15, the respective lock pins 40, 50 are elastically restored and the distal end portions thereof are brought into engagement with the engagement holes 15, 15, respectively. The end face of the glove box 10 abuts against the rear side of the front plate 21 of the lid 20 to be supported thereon, where the lid 20 can be locked in the closed state relative to the recess 13.

Since the distal end portions of the pair of lock pins 40, 50 are made to be brought into engagement with the pair of engagement holes 15, 15, respectively, even in the event that, for example, a slight warp is produced in the lid 20 or a slight dimension error is generated between the lid 20 and the recess 13 of the automobile, the lid 20 can be held in the closed state without any looseness.

Figure 8:
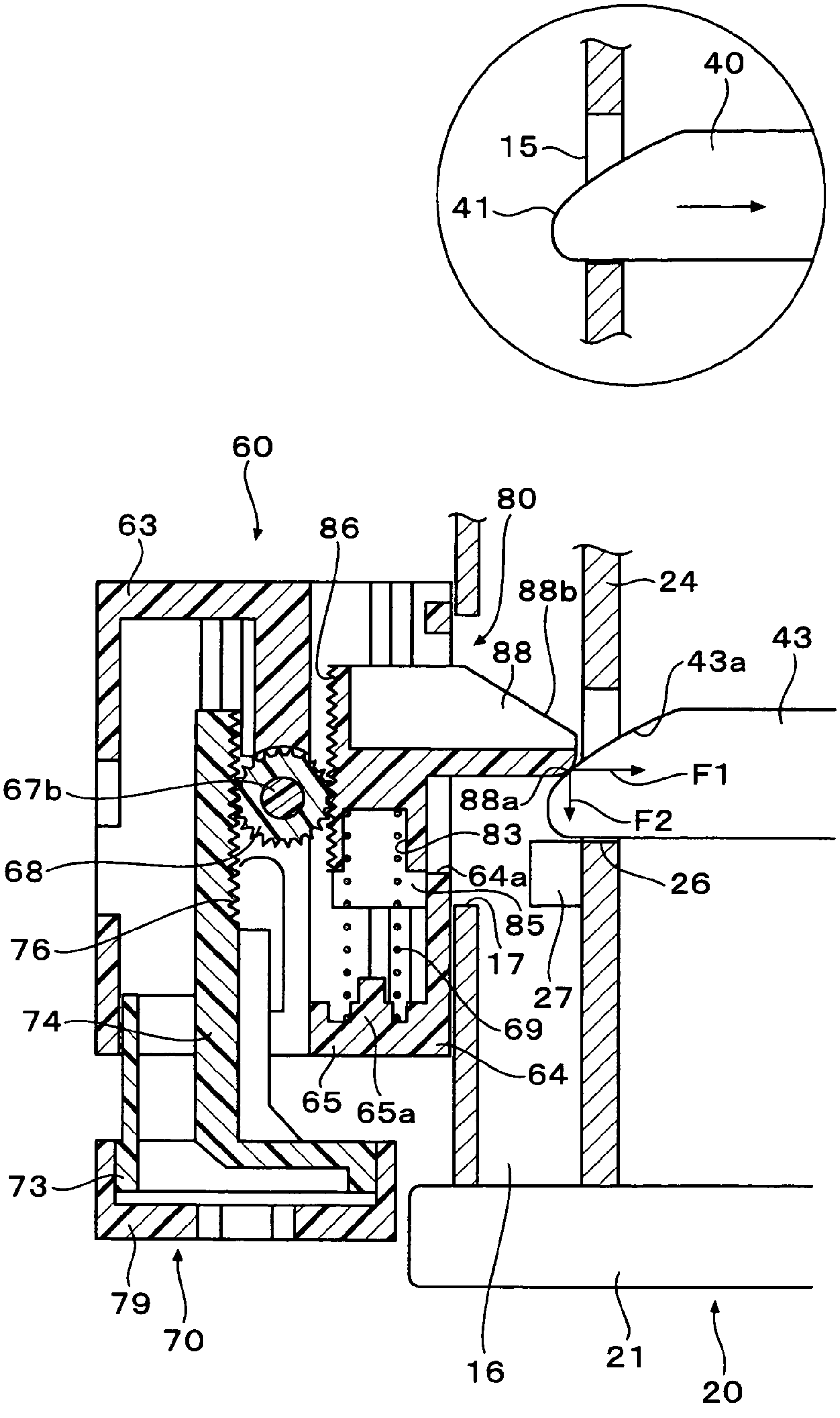
FIG. 8 is a sectional view showing a second operating state of the lock releasing unit.

Next, an operation will be described which is performed when the lid 20 is opened by releasing the locked state of the lid 20. This operation will be implemented by pushing the push button 70 of the lock releasing unit 60. FIGS. 7 to 9 show states of the push button 70 and the pushing element 80 are operated when the lid 20 is closed and states of the pushing element receiving portion 43 which is pushed by the pushing element 80. The figures also illustrate states of the first lock pin 40 which is operated to slide by being linked with the operations of the pushing element receiving portion 43. While a state resulting before the push button 70 is pushed is shown in FIG. 7, in this state, the front end face of the push button 70 is positioned substantially in the same position as the front end face of the lid 20, and the corner portion 88*a* of the push pin 88 of the pushing element 80 is in such a state that the corner portion 88*a* is in abutment with or lies close to the receiving portion slope 43*a* of the pushing element receiving portion 43 which is lined with the first lock pin 40. The distal end portion of the first lock pin 40 is in engagement with the engagement hole 15.

As is shown in FIG. 8, when the push button 70 is pushed from the state described above against the urging force of the coil spring 69, the push pin 88 is moved by being linked with the operation of the push button 70 in the opposite direction to the direction in which the push button 70 is pushed via the rack and pinion mechanism. As this occurs, since the receiving portion slope 43*a* is formed on the pushing element receiving portion 43, a pushing force from the corner portion 88*a* of the push pin 88 to the receiving portion slope 43*a* acts not only as indicated by an arrow F1 in FIG. 8 in a direction in which the first lock pin 40 is caused to retreat into the interior of the lid 20 but also as indicated by an arrow F2 in the direction in which the lid 20 is opened. In addition, in conjunction with this, the distal end portion of the first lock pin 40 also slides out from the engagement hole 15 in a direction indicated by arrow in the figure.

Figure 11:
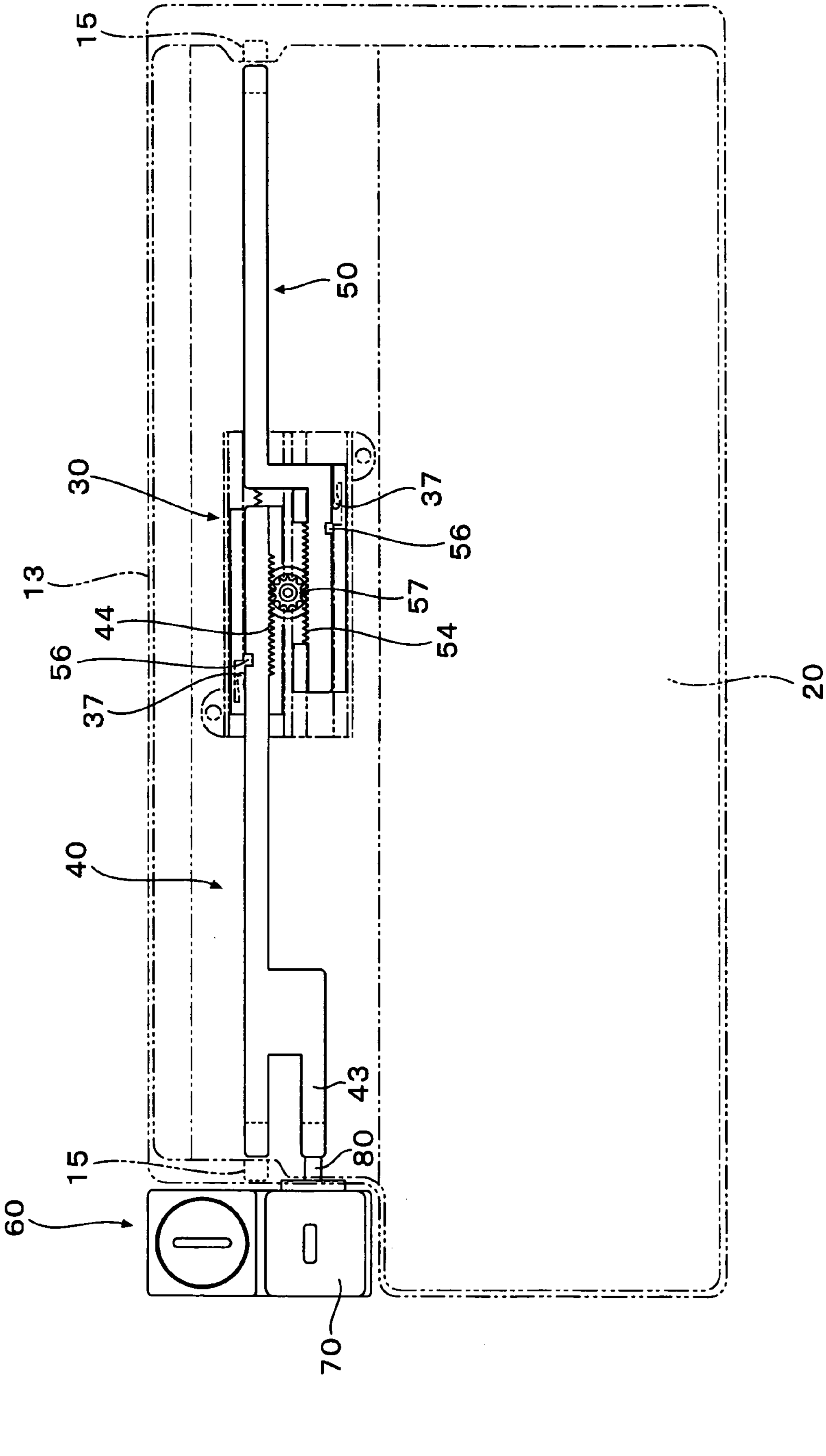
FIG. 11 is an explanatory views showing a state in which the lid is closed by the lid opening and closing system.

When the push button 70 is pushed further from the state above, the pushing element receiving portion 43 is caused to retreat further into the interior of the lid 20 (refer to FIG. 9), and in conjunction with this, the distal end portion of the first lock pin 40 is pulled out from the engagement hole 15 on the inner circumference of the recess 13. In conjunction with the sliding operation of the first lock pin 40, the distal end portion of the second lock pin 50 is also pulled out from the engagement hole 15, whereby the locked state of the lid 20 relative to the recess is released as is shown in FIG. 11.

Thus, according to the lid opening and closing system, when the push button 70 is pushed, the pushing element 80 is driven to move in the opposite direction to the direction in which the push button 70 is pushed by being linked with the operation of the push button 70 to thereby contact the pushing element receiving portion 43 which is provided continuously to the first lock pin 40, and the respective lock pins 40, 50 are pushed through the receiving portion slope 43*a* on the abutting surface to be retreated into the interior of the lid 20, whereby the locked state is released, allowing the lid 20 to be opened.

As this occurs, the pushing force acting on the pushing element receiving portion 43 is divided into the directions indicated by the arrows F1, F2 in FIG. 8 by the receiving portion slope 43*a*. That is, the pushing force acts not only in the direction in which the respective lock pins 40, 50 are forced towards the lid 20 side but also in the direction in which the lid 20 is opened. Because of this, when the distal end portions of the respective lock pins 40, 50 are pulled out respectively from the pair of engagement holes 15, 15 on the inner circumference of the recess 13, the force acts in the direction in which the lid 20 is opened, whereby the lid 20 can be opened smoothly from the recess 13. Consequently, even in such a state that a frictional force is exerted between the lid 20 and the recess 13, making it difficult for the lid 20 to be opened by gravity, the lid 20 can be opened in an ensured fashion.

Figure 15:
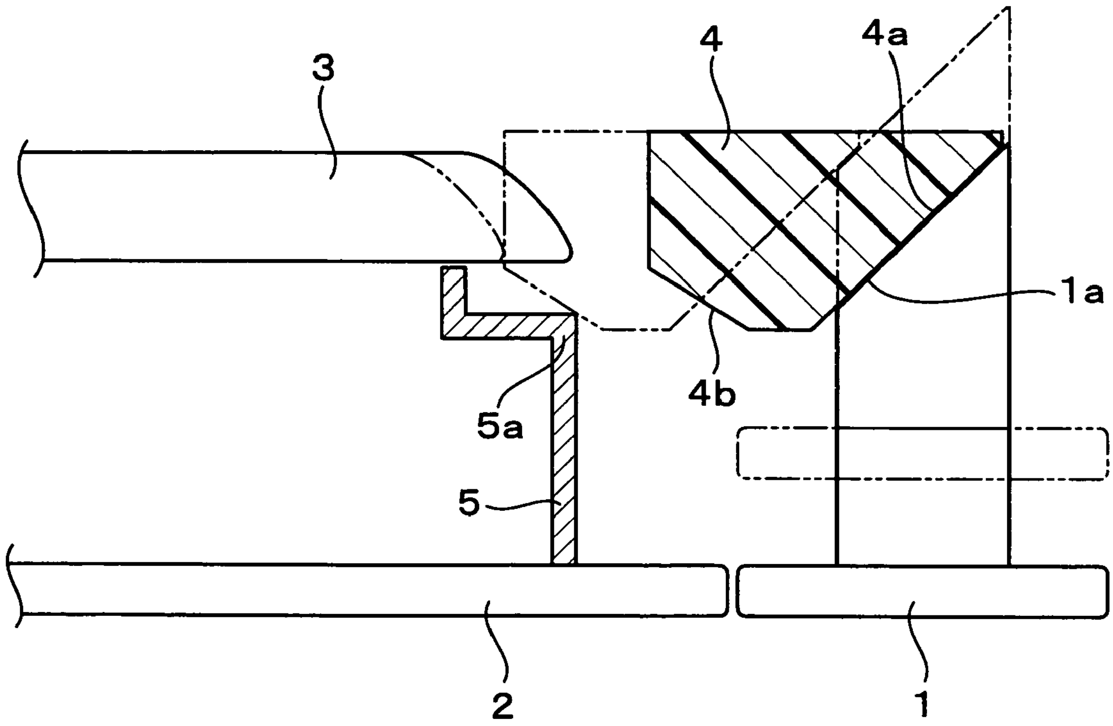
FIG. 15 is an explanatory view showing the related art.

Since the pushing element 80 is made to moves in the opposite direction to the direction in which the push button 70 is pushed via the rack and pinion mechanism so as to force the lock pins into the lid, compared with the configuration shown in FIG. 15 in which the engagement member 3 (the lock pin) is caused to retreat via the pin 4 which moves at right angles to the button 1, the pushing force from the push button 70 can be made to act on the lock pin efficiently, thereby making it possible to facilitate the opening of the lid 20.

In addition, in this embodiment, since the pushing raised portion 27 is provided on the side of the lid 20, as is shown in FIG. 9, after the locked state is released by the respective lock pins 40, 50 being pushed towards the lid 20 side by the trusting element 80 and the pushing element receiving portion 43 have been retreated into the interior of the lid 20, the push pin 88 contacts the pushing raised portion 27 to directly act the pushing force on the lid 20 in the direction in which the lid 20 is opened, thereby making it possible to open the lid 20 in a more ensured fashion.

In this embodiment, the push pin 88 of the pushing element 80 is made to push at not the distal end portion of the lock pin which is engaged with the engagement hole 15 but at the pushing element receiving portion 43 which is different from the distal end portion, so as to cause the respective lock pins 40, 50 to retreat toward the lid 20. Therefore, an angle of the receiving portion slope 43*a* with respect to the longitudinal side face of the first lock pin can be changed while keeping the shape of the lock pins 40, 50. That is, the angle of the receiving portion slope 43*a* can be set to change a ratio between a moving amount of the lock pins 40, 50 and a moving amount of the pushing pin 88 while ensuring a sufficient locking condition. For example, when the angle is formed gently, the pushing stroke of the push button 70 required to release the lock state is reduced. On the other hand, when the angle is formed steeply, the pushing force of the push button 70 is reduced.

In addition, in this embodiment, since the rack and pinion mechanism is adopted to move the pushing element 80 by being linked with the operation of the push button 70, the lid opening and closing system can be realized with the relatively simple and space saving mechanism.

Figure 12:
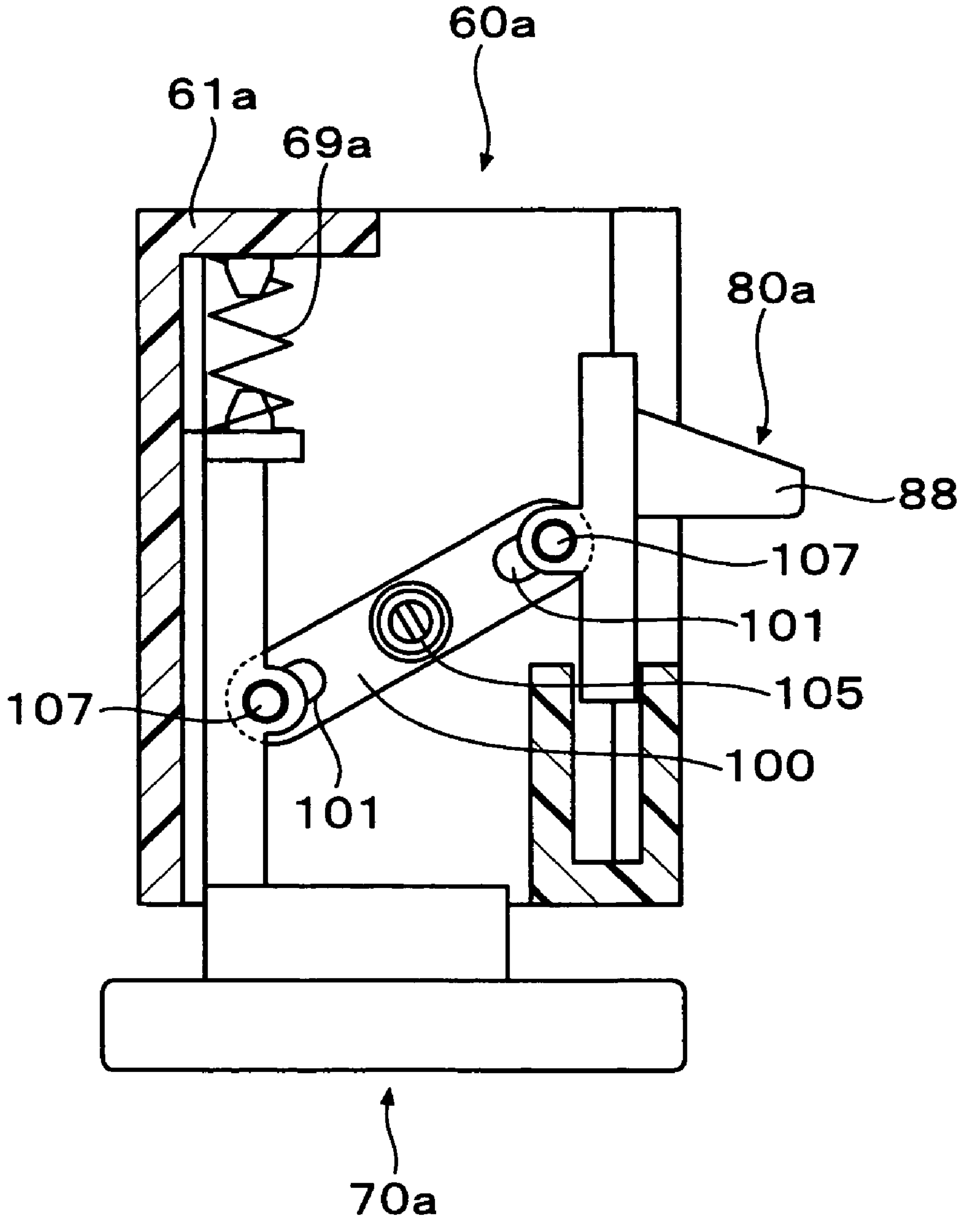
FIG. 12 is a sectional view showing a main part of a lid opening and closing system according to a second embodiment.

FIG. 12 shows a lid opening and closing system according to a second embodiment. Note that like reference numerals are imparted to substantially like portions to those of the embodiment that has been described above, and the description thereof will be omitted.

In the embodiment above, the mechanism to move the pushing element by being linked with the operation of the push button is made up by the rack and pinion mechanism. This embodiment differs from the previous embodiment in that the mechanism to move the pushing element is made up of a link lever mechanism.

As is shown in FIG. 12, in a lock releasing unit 60*a* of this embodiment, a push button 70*a* is mounted on a case main body 61*a* in such a manner as to slide relative thereto via a slide guide, not shown, and a coil spring 69*a* is interposed between a rear end portion of the push button 70*a* and a rear wall of the case main body 61, whereby the push button 70*a* is urged in a direction in which it moves away from a front side of the case main body 61. In addition, a pushing element 80*a* is also mounted on the case main body 61*a* to slide relative thereto via a slide guide, not shown. A rotating lever 100 having elongated holes 101, 101 provided in both ends thereof is rotatably supported on a support shaft 105 which is provided in the center of the case main body 61*a*, and the push button 70*a* and the pushing element 80*a* are coupled to the elongated holes 101, 101 via pins 107, 107, respectively, and are slidably linked with each other.

When the push button 70*a* is pushed, the pushing element 80 is made to move in an opposite direction to the direction in which the push button 70*a* is pushed via the rotating lever 100, and as with the embodiment described above, the mechanism to move the pushing element 80 by being linked with the operation of the push button 70 can be realized by the relatively simple and space saving mechanism.

Figure 13:
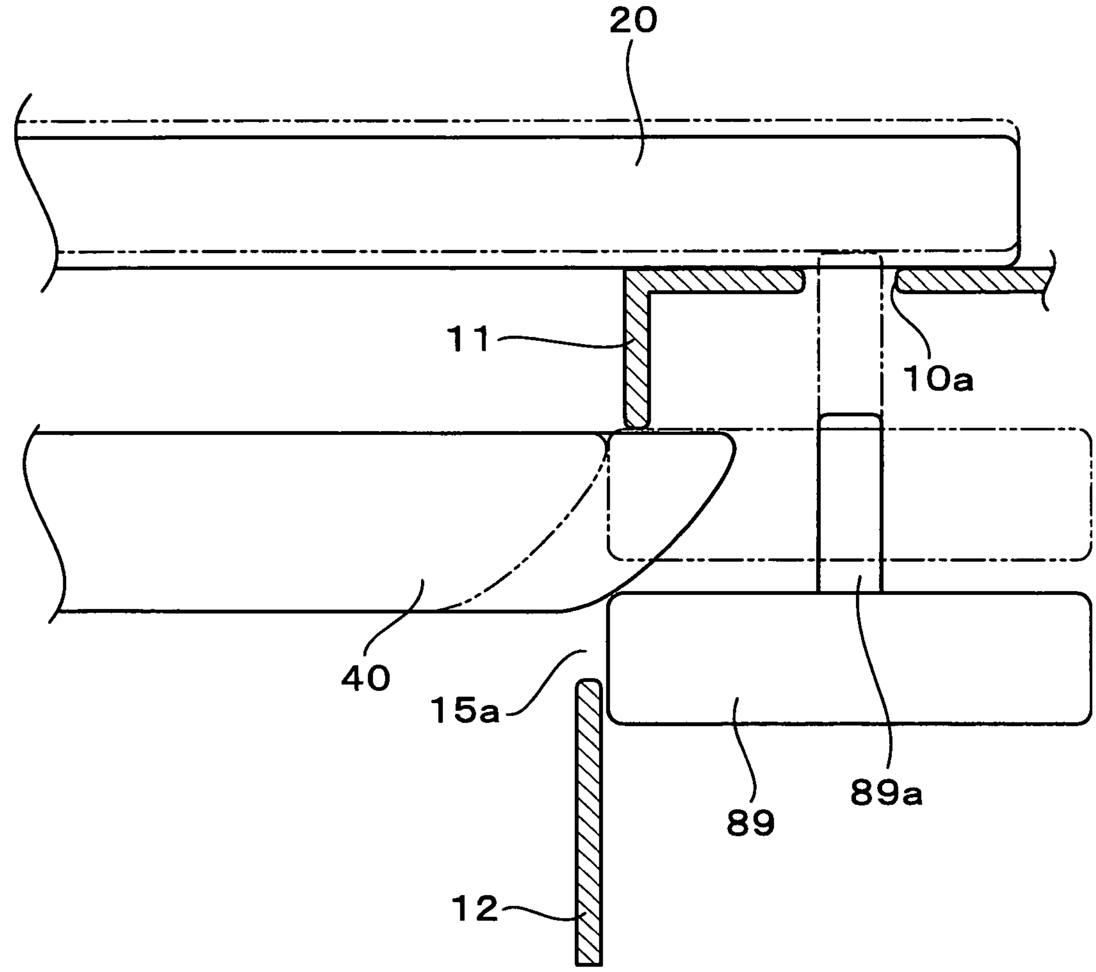
FIG. 13 is an explanatory view showing a lid opening and closing system according to a third embodiment.

FIG. 13 shows a lid opening and closing system according to a third embodiment. Note that like reference numerals are imparted to substantially like portions to those of the embodiment that has been described above, and the description thereof will be omitted.

In the embodiments described above, the pushing element 80 pushes at the pushing element receiving portion 43. On the other hand, in this embodiment, a distal end portion of a lock pin which is brought into engagement with an engagement hole 15 on an inner circumference of a recess 13 is made to be pushed directly.

In this embodiment, a circumferential wall of a glove box 10 differs from those of the embodiments described above. Namely, a passage hole 10*a* is formed in a wall surface on a front side, and front and rear walls 11, 12 which lie on both peripheral edges of an engagement hole 15*a* are such that the rear wall 12 (the edge portion which lies farther apart from a lid) is provided further inwards of the lid 20 than the front wall 11 (the edge portion which lies closer to the lid). As a result of this, when a pushpin 89 moves (refer to a two-dotted line) to push a first lock pin 40, a distal end portion of the first lock pin 40 is prevented from being hooked on a circumferential edge of the engagement hole 15*a*. In addition, a push rib 89*a* is provided in the center of a front side of the push pin 89 to erect to a given height, and when the push pin 89 moves, the push rib 89*a* passes through the passage hole 10*a* to directly contact a rear side of the lid 20, thereby pushing the lid 20 to open.

In addition, in this embodiment, when a push button, not shown, is pushed to move the push pin 89, the first lock pin 40 is caused to retreat directly into the interior of the lid 20 so as to be pulled out from the engagement hole 15, and the push rib 89*a* passes through the passage hole 10*a* to abut against the rear side of the lid 20, so as to impart a pushing force in a direction in which the lid 20 is opened, whereby the lid 20 can be opened in an ensured fashion.

Figure 14:
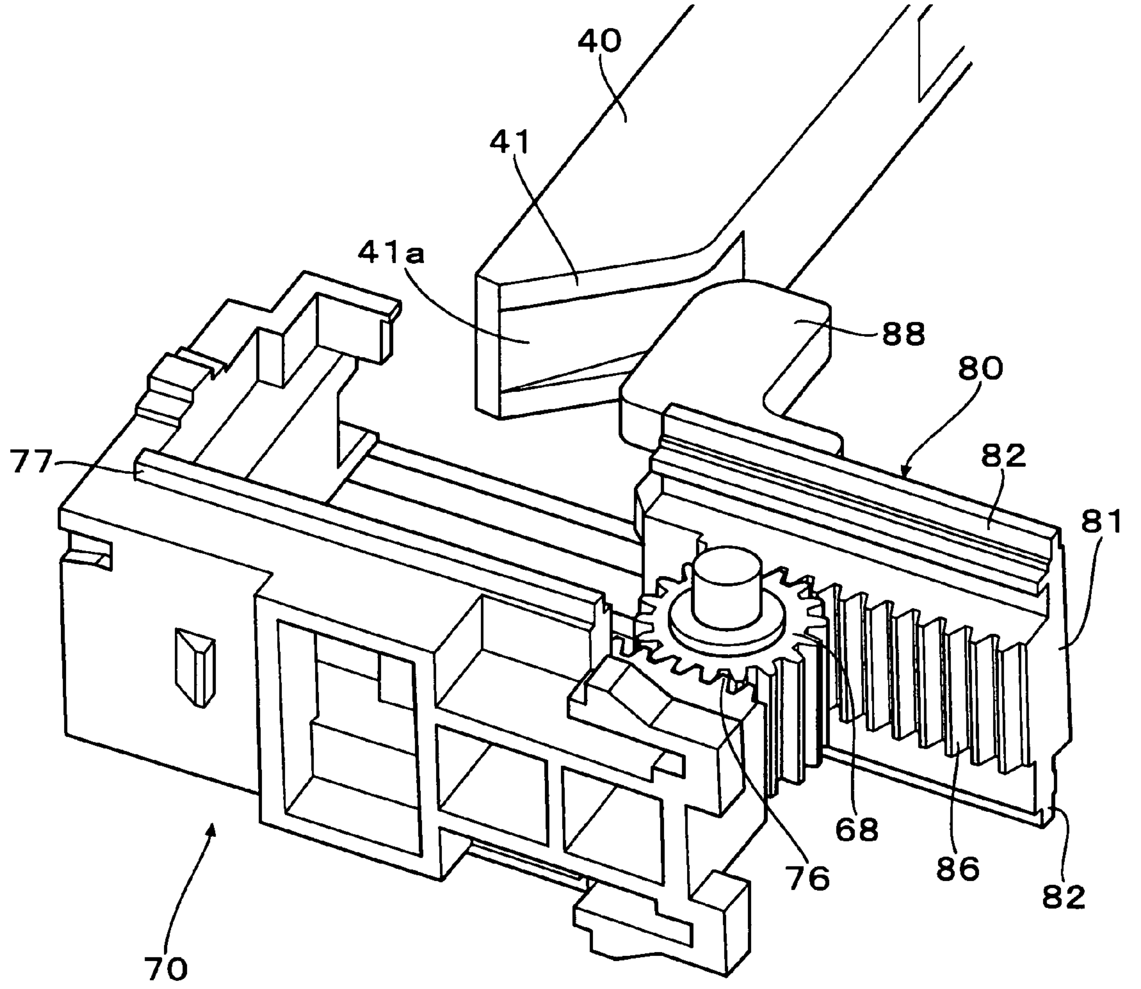
FIG. 14 is a perspective view showing a lid opening and closing system according to a fourth embodiment.

FIG. 14 shows a lid opening and closing system according to a fourth embodiment. Note that like reference numerals are imparted to substantially like portions to those of the embodiment that has been described above, and the description thereof will be omitted.

In the embodiment, as with the third embodiment shown in FIG. 13, a distal end portion of a lock pin which is brought into engagement with an engagement hole on an inner circumference of a recess 13 is made to be directly pushed by a pushing element 80. In addition, a pushing element slope 41*a* is provided in a central portion of a pin slope 41 provided at the distal end portion of the first lock pin 40 in such a manner as to be formed in a given depth and at a different inclination angle from that of the pin slope 41. Specifically, the pushing element slope 41*a* is formed at a less steep inclination angle than the pin slope 41 relative to a longitudinal side face of the first lock pin 40, and when the pushing element 80 is driven to slide to push at the pushing element slope 41*a* by being linked with the operation of a push button 70, the first lock pin 40 is made to move largely relative to a moving amount of the pushing element 80. On the other hand, the pin slope 41 is formed at a steeper angle than the pushing element slope 41*a* relative to the longitudinal side face of the first lock pin 40, whereby when a lid 20 is closed, the first lock pin 40 is made to retreat smoothly into the interior of the lid 20.

Figure 16:
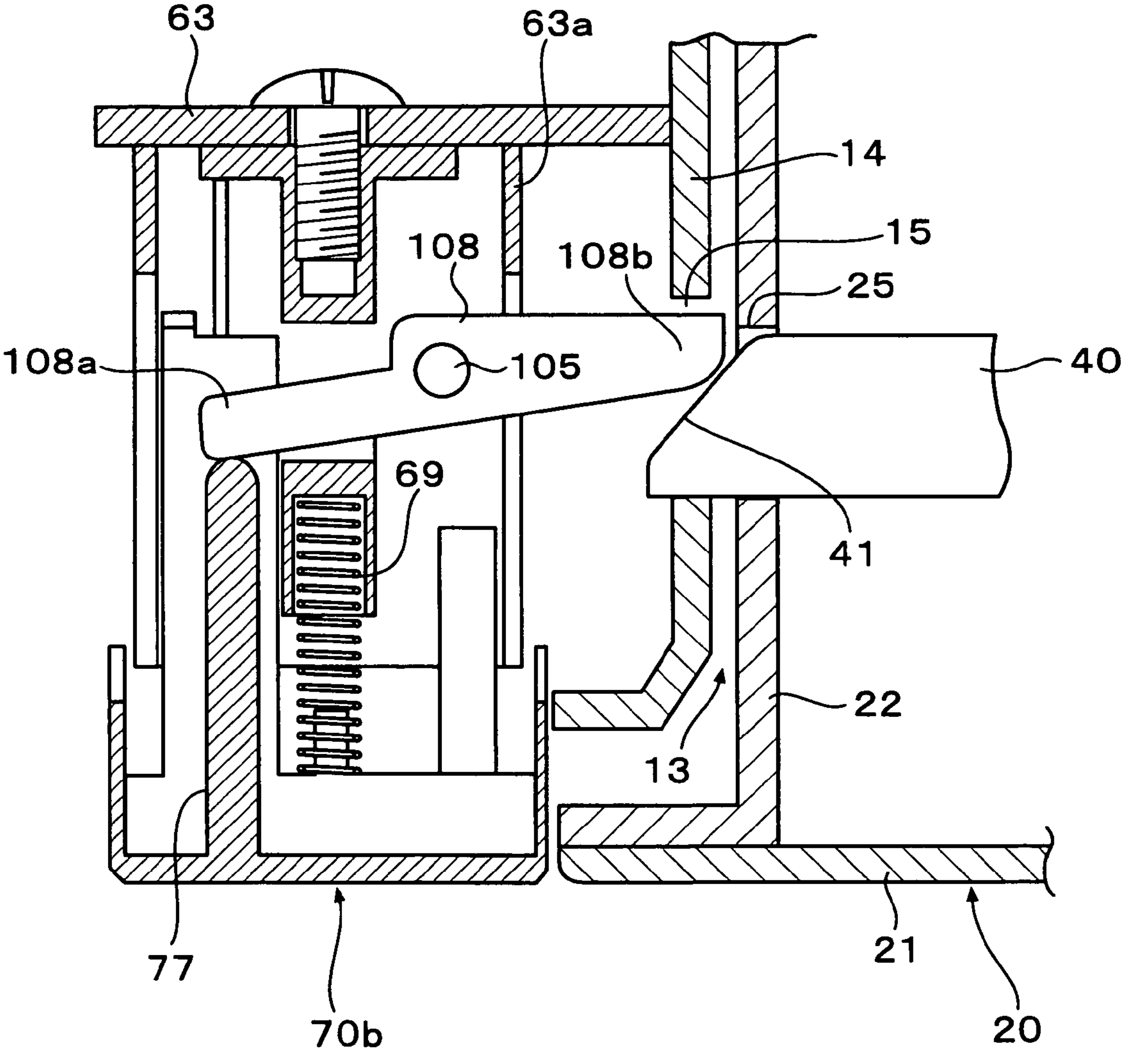
FIG. 16 is an explanatory view showing a lid opening and closing system according to a fifth embodiment.

FIG. 16 shows a lid opening and closing system according to a fifth embodiment. Note that like reference numerals are imparted to substantially like portions to those of the embodiments that have been described above, and the description thereof will be omitted.

In the fifth embodiment, the push button 70*b* is urged by the spring 69 to protrude from the lower case 63 and is configured to be retreatable into the lower case 63. On a rear surface of the push button 70*b*, a pusher 77 is provided to project therefrom.

In the lower case 63, a rotating lever 108 is disposed. The rotating lever 108 is rotatably supported on a support shaft 105. One end 108*a* of the rotating lever 108 abuts the distal end portion of the pusher 77.

As with the foregoing embodiments, a pin passage hole 25 is formed on a side wall 22 of the lid 20, so that the distal end portion of the first lock pin 40 is protruded from the pin passage hole 25 and engaged with the engagement hole 15 formed in the inner wall 14 of the recess 13. The other end 108*b* of the rotating lever 108 is configured to abut the pin slope 41 of the first lock pin 40.

When the push button 70*b* is pushed, the pusher 77 pushes the one end 108*a* of the rotating lever 108 to rotate the rotating lever 108, and the other end 108*b* pushes the pin slope 41 of the first lock pin 40. While the first lock pin 40 is retreated into the pin passage hole 25 to be disengaged from the engagement hole 15, the lid 20 is pushed by the other end 108*b* of the rotating lever 108 through the first lock pin 40 into the opening direction thereof, thereby smoothly opening the lid 20.

In this embodiment, by pushing the one end 108*a* of the rotating lever 108 through the pusher 77 of the push button 70*b*, the other end 108*b* of the rotating lever 108 directly pushes the pin slope 41 of the first lock pin 40. Therefore, the structure can be simplified as compared with the second embodiment shown in FIG. 12.

Figure 17:
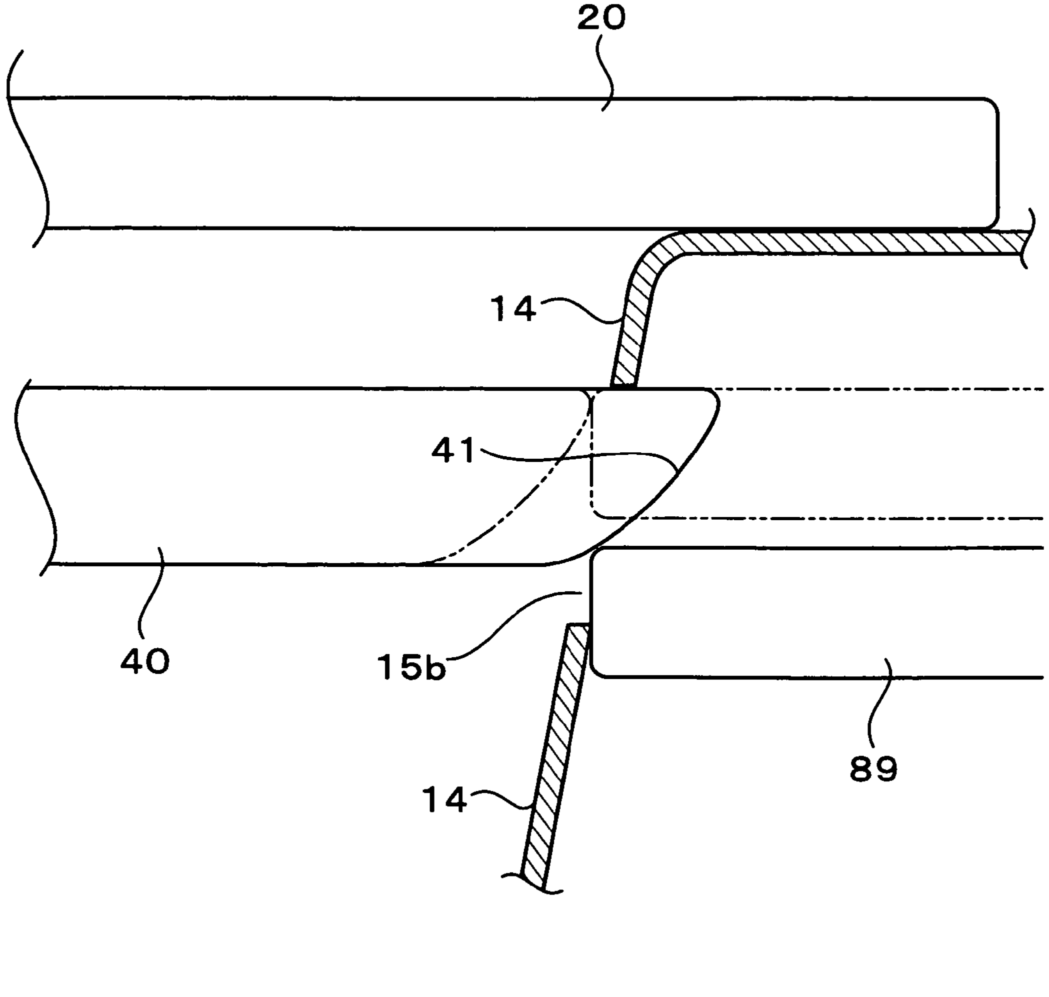
FIG. 17 is an explanatory view showing a lid opening and closing system according to a sixth embodiment.

FIG. 17 shows a lid opening and closing system according to a sixth embodiment. Note that like reference numerals are imparted to substantially like portions to those of the embodiments that have been described above, and the description thereof will be omitted.

In the third embodiment, the inner wall of the recess 13 is divided into the front wall 11 and the rear wall 12 as shown in FIG. 13. In the sixth embodiment, instead of the front and rear walls 11 and 12, a wall 14 formed in a planar shape is provided. The wall 14 is slanted toward a central side of the lid 20 as extend away from the lid 20 as shown in FIG. 17.

In this embodiment, by pushing the push button (not shown), the push pin 89 is moved toward the front side of the lid 20 to push the pin slope 41 of the first lock pin 40 engaged with the engagement hole 15. Therefore, the first lock pin 40 is retreated toward the lid 20 and is disengaged from the engagement hole 15.

According to an aspect of the present invention, since when the push button is pushed, the pushing element is driven to move in the opposite direction to the pushing direction of the push button in conjunction with the operation of the push button and the lock pin is caused to retreat into the lid's side by the slope provided at least one of the abutting surfaces, the locked state is released, whereby the lid can be opened.

As this occurs, since the pushing element pushes the lock pin by the slope provided at least one of the abutting surfaces hot only in the direction in which the lock pin is caused to retreat in the lid's side but also in the direction in which the lid is opened, when the lock pin is pulled out from the engagement hole provided on the inner circumference of the recess, the force which acts in the direction in which the lid is opened is exerted, as a result of which the lid can be opened in an ensured fashion even in a state in which a frictional force is exerted between the lid and the recess, making it difficult for the lid to open by gravity.

What is claimed is:

1. A lid opening and closing system comprising:
a lid that is mounted to a recess formed in a vehicle to be opened and closed with respect to the recess;
a locking unit that is disposed on the lid and that retains the lid in a locked state when the lid is closed; and
a lock releasing unit that is disposed in the vehicle and that releases the locked state of the lid,
wherein the locking unit includes:
a lock pin that is urged to protrude from a peripheral edge of the lid, that is retreatable into the peripheral edge and that is engaged with an engagement hole provided on an inner circumference of the recess in the locked state,
wherein the lock releasing unit includes:
a push button that is pushable in a pushing direction that is a direction from a front to a rear of the lid;
a pushing element that is moved to push the lock pin or a part that is linked therewith to retreat the lock pin toward the lid to release the locked state; and
a link unit that links the push button and the pushing element so that the pushing element is moved in an opposite direction of the pushing direction when the push button is pushed, and
wherein a slope is provided at least one of contacting surfaces of the lock pin and the pushing element.

2. The lid opening and closing system according to claim 1, wherein the pushing element contacts a part of the lid and pushes the lid in a opening direction thereof when the locked state is released.

3. The lid opening and closing system according to claim 1, wherein the link unit includes a rack and pinion mechanism or a link lever mechanism.

4. The lid opening and closing system according to claim 1, wherein the lock pin includes:
a pair of lock pins that are linked with each other to protrude from and retreat into both sides of the peripheral edge of the lid, and
wherein a pair of engagement holes are provided on both sides of the inner circumference of the recess to be engaged with the pair of lock pins.

5. The lid opening and closing system according to claim 1, wherein the lock pin includes:
a pin portion that is engaged with the engagement hole; and
a receiving portion that is bifurcated from the pin portion, and
wherein the pushing element pushes the receiving portion to retreat the lock pin toward the lid.

6. The lid opening and closing system according to claim 1, wherein an inner circumference of the engagement hole includes:

a first edge that is located at a position away from the lid; and a second edge that is located at a position closer to the lid, wherein the second edge is positioned outwardly in a projecting direction of the lock pin than the first edge, and wherein the pushing element is moved along a direction from the first edge to the second edge to retreat the lock pin toward the lid.

7. The lid opening and closing system according to claim 1, wherein the lock pin includes:

a first slope that is provided at a distal end portion thereof and that contacts the a peripheral edge of the recess to retreat the lock pin when the lid is closed; and a second slope that is disposed adjacent to the first slope and that is pushed by the pushing element when the lid is opened, and wherein the first slope is formed steeper than the second slope with respect to the a longitudinal side face of the lock pin.

* * * * *